United States Patent
Kobel et al.

(10) Patent No.: US 12,096,313 B2
(45) Date of Patent: *Sep. 17, 2024

(54) EQUIPMENT VISUAL STATUS INDICATOR SYSTEM AND METHOD

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US); Greg Pray, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,643

(22) Filed: Apr. 12, 2023

(65) Prior Publication Data

US 2023/0247390 A1 Aug. 3, 2023

Related U.S. Application Data

(63) Continuation of application No. 17/576,717, filed on Jan. 14, 2022, now Pat. No. 11,678,148.

(51) Int. Cl.
*H04W 4/08* (2009.01)
*B66F 9/06* (2006.01)
(Continued)

(52) U.S. Cl.
CPC ............... *H04W 4/08* (2013.01); *B66F 9/06* (2013.01); *B66F 9/0755* (2013.01);
(Continued)

(58) Field of Classification Search
CPC .......... G08B 19/00; G08B 23/00; G08B 3/00; G08B 5/36; G08B 7/06; G08B 21/18;
(Continued)

(56) References Cited

U.S. PATENT DOCUMENTS 3,009,747 A   11/1961 Pitzer
4,099,761 A   7/1978 Cullings
(Continued)

FOREIGN PATENT DOCUMENTS

CN   111126522 A   5/2020
DE   10 2007 020 182 A1   10/2008
(Continued)

OTHER PUBLICATIONS

International Search Report and Written Opinion issued in connection with PCT Appl. Ser. No. PCT/US2022/012610 dated Jun. 21, 2022 (19 pages).
(Continued)

*Primary Examiner* — Brian Wilson
(74) *Attorney, Agent, or Firm* — Foley & Lardner LLP

(57) ABSTRACT

A lift device having an implement, a prime mover configured to drive the implement, and a connectivity module communicably coupled with the lift device. The connectivity module is configured to determine a parameter set relating to the lift device, receive a request to provide a status of the component of the lift device, receive a measure associated with the attribute of the component of the lift device, compare the received measure and the threshold measure associated with the attribute of the component of the lift device, and provide, based on the comparison, an indication in accordance with the indication characteristic representing the status of the component of the lift device.

20 Claims, 17 Drawing Sheets

Related U.S. Application Data

(60) Provisional application No. 63/137,950, filed on Jan. 15, 2021, provisional application No. 63/137,978, filed on Jan. 15, 2021, provisional application No. 63/138,016, filed on Jan. 15, 2021, provisional application No. 63/137,867, filed on Jan. 15, 2021, provisional application No. 63/137,996, filed on Jan. 15, 2021, provisional application No. 63/138,003, filed on Jan. 15, 2021, provisional application No. 63/138,015, filed on Jan. 15, 2021, provisional application No. 63/137,955, filed on Jan. 15, 2021, provisional application No. 63/137,893, filed on Jan. 15, 2021, provisional application No. 63/138,024, filed on Jan. 15, 2021.

(51) Int. Cl.

| | | |
|---|---|---|
| *B66F 9/075* | (2006.01) | |
| *B66F 9/12* | (2006.01) | |
| *B66F 11/04* | (2006.01) | |
| *G05B 19/4155* | (2006.01) | |
| *G05D 1/00* | (2006.01) | |
| *G05D 1/225* | (2024.01) | |
| *G05D 1/226* | (2024.01) | |
| *G06F 3/0482* | (2013.01) | |
| *G06F 3/0484* | (2022.01) | |
| *G06F 3/0488* | (2022.01) | |
| *G06Q 10/20* | (2023.01) | |
| *G06Q 30/0601* | (2023.01) | |
| *G07C 5/00* | (2006.01) | |
| *G07C 5/08* | (2006.01) | |
| *G08B 3/00* | (2006.01) | |
| *G08B 5/36* | (2006.01) | |
| *G08B 7/06* | (2006.01) | |
| *G08B 21/18* | (2006.01) | |
| *H04L 67/52* | (2022.01) | |
| *H04L 67/63* | (2022.01) | |
| *H04W 4/029* | (2018.01) | |
| *H04W 4/30* | (2018.01) | |
| *H04W 4/40* | (2018.01) | |
| *H04W 4/70* | (2018.01) | |
| *H04W 8/00* | (2009.01) | |
| *H04W 48/16* | (2009.01) | |
| *H04W 76/14* | (2018.01) | |
| *H04W 76/15* | (2018.01) | |
| *H04W 76/23* | (2018.01) | |
| *B66F 17/00* | (2006.01) | |
| *G06F 16/93* | (2019.01) | |
| *H04W 4/35* | (2018.01) | |
| *H04W 4/80* | (2018.01) | |
| *H04W 84/12* | (2009.01) | |
| *H04W 84/18* | (2009.01) | |
| *H04W 88/08* | (2009.01) | |

(52) U.S. Cl.
CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/225* (2024.01); *G05D 1/226* (2024.01); *G06F 3/0482* (2013.01); *G06F 3/0484* (2013.01); *G06F 3/0488* (2013.01); *G06Q 10/20* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(58) Field of Classification Search
CPC ......... H04W 4/08; H04W 4/029; H04W 4/30; H04W 4/40; H04W 4/70; H04W 8/005; H04W 48/16; H04W 76/14; H04W 76/15; H04W 76/23; H04W 4/35; H04W 4/80; H04W 84/12; H04W 84/18; H04W 88/08; H04W 88/085; H04W 4/021; H04W 4/38; H04W 4/44; H04W 4/46; B66F 9/06; B66F 9/0755; B66F 9/07581; B66F 9/12; B66F 11/046; B66F 11/04; B66F 17/006; B66F 9/24; G05B 19/4155; G05B 2219/45049; G05D 1/0022; G05D 1/0027; G05D 1/0044; G05D 1/005; G05D 1/225; G05D 1/226; G06F 3/0482; G06F 3/0484; G06F 3/0488; G06F 16/93; G06Q 10/20; G06Q 30/0611; G06Q 30/0631; G06Q 30/0641; G06Q 10/06; G07C 5/006; G07C 5/0825; H04L 67/52; H04L 67/63; H04L 67/56; H04L 67/125; H04L 67/12

See application file for complete search history.

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,493,881 A | 2/1996 | Harvey |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |

(56) References Cited

U.S. PATENT DOCUMENTS

| | | |
|---|---|---|
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |
| 9,387,985 B2 | 7/2016 | Gillmore et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,457,533 B2 | 10/2019 | Puszkiewicz et al. |
| 10,899,538 B2 | 1/2021 | Nelson et al. |
| 11,252,149 B1 | 2/2022 | Bang et al. |
| 11,948,019 B1 | 4/2024 | Singh et al. |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1 | 8/2003 | Pillar et al. |
| 2005/0140154 A1 | 6/2005 | Vigholm et al. |
| 2005/0149920 A1 | 7/2005 | Patrizi et al. |
| 2007/0213869 A1 | 9/2007 | Bandringa et al. |
| 2009/0005928 A1 | 1/2009 | Sells et al. |
| 2009/0049441 A1 | 2/2009 | Mii et al. |
| 2009/0099897 A1 | 4/2009 | Ehrman et al. |
| 2009/0101447 A1 | 4/2009 | Durham et al. |
| 2010/0179844 A1 | 7/2010 | Lafergola et al. |
| 2011/0081193 A1 | 4/2011 | Nilsson |
| 2012/0046809 A1 | 2/2012 | Wellman |
| 2013/0057007 A1 | 3/2013 | Howell et al. |
| 2013/0127611 A1* | 5/2013 | Bernstein ............ H01M 10/48 340/455 |
| 2013/0132140 A1 | 5/2013 | Amin et al. |
| 2013/0240300 A1 | 9/2013 | Fagan et al. |
| 2014/0278621 A1 | 9/2014 | Medwin et al. |
| 2014/0312639 A1 | 10/2014 | Petronek |
| 2015/0376869 A1 | 12/2015 | Jackson |
| 2016/0121490 A1 | 5/2016 | Ottersland |
| 2016/0208992 A1 | 7/2016 | Parsons |
| 2016/0272471 A1 | 9/2016 | Jaipaul |
| 2016/0304051 A1 | 10/2016 | Archer et al. |
| 2016/0318438 A1 | 11/2016 | Wadell |
| 2016/0371433 A1 | 12/2016 | Polesskiy et al. |
| 2017/0269608 A1 | 9/2017 | Chandrasekar et al. |
| 2017/0291805 A1 | 10/2017 | Hao et al. |
| 2018/0065544 A1* | 3/2018 | Brusco .................. B60L 1/14 |
| 2018/0143734 A1 | 5/2018 | Ochenas et al. |
| 2018/0151037 A1 | 5/2018 | Morgenthau et al. |
| 2019/0180354 A1 | 6/2019 | Greenberger et al. |
| 2019/0246060 A1 | 8/2019 | Tanabe et al. |
| 2020/0134955 A1 | 4/2020 | Kishita |
| 2020/0207166 A1 | 7/2020 | Froehlich |
| 2020/0317489 A1 | 10/2020 | Bhatia et al. |
| 2021/0023985 A1 | 1/2021 | Stadnyk |
| 2021/0055178 A1 | 2/2021 | Hinderling et al. |
| 2021/0087035 A1 | 3/2021 | Yip et al. |
| 2021/0232137 A1 | 7/2021 | Whitfield et al. |
| 2021/0250178 A1 | 8/2021 | Herman et al. |
| 2022/0156921 A1 | 5/2022 | Humpston et al. |
| 2022/0221365 A1 | 7/2022 | Mahurkar et al. |

FOREIGN PATENT DOCUMENTS

| | | |
|---|---|---|
| EP | 1 136 433 A2 | 9/2001 |
| EP | 2 886 507 A1 | 6/2015 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| JP | H1059698 A | 3/1998 |
| JP | 2016-159996 A | 9/2016 |
| JP | 2020-128270 A | 8/2020 |
| JP | 2021-052920 A | 4/2021 |
| WO | WO-01/30671 A2 | 5/2001 |
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

Notification of Transmittal of the International Search Report and the Written Opinion of the International Search Authority, or the Declaration issued in connection with PCT Appl. Ser. No. PCT/US2022/012603 dated Jul. 6, 2022 (27 pages).

Notification of Transmittal of the International Search Report and the Written Opinion of the International Search Authority, or the Declaration issued in connection with PCT Appl. Ser. No. PCT/US2022/012628 dated Jul. 6, 2022 (27 pages).

Suzuki et al., "Teleoperation of Multiple Robots through the Internet", IEEE International Workshop on Robot and Human Communication, published 1996, pp. 84-89 (Year: 1996).

\* cited by examiner

326

326

326

326

EQUIPMENT VISUAL STATUS INDICATOR SYSTEM AND METHOD

CROSS-REFERENCE TO RELATED PATENT APPLICATIONS

This application is a continuation of U.S. patent application Ser. No. 17/576,717, filed on Jan. 14, 2022, which claims the benefit of and priority to U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are hereby incorporated by reference herein.

BACKGROUND

Work equipment such as lift devices and telehandlers sometimes require tracking, tasking, monitoring, and servicing at a work site. Managers and operators of working machines typically rely on discrete systems, applications, and methods to perform these functions for each piece of equipment. Often, physical inspection of a machine is necessary to determine a state, status, or condition of the machine. Additionally, on work sites encompassing a large area or involving many pieces of equipment, it is often time consuming for equipment operators or service technicians to determine the statuses for a large number of machines prior to assigning a machine to a task.

SUMMARY

One exemplary implementation of the present disclosure relates to a lift device. The lift device includes an implement, a prime mover configured to drive the implement, and a connectivity module communicably coupled with the lift device. The connectivity module is configured to receive an input relating to a status of the lift device, and provide an indication representing the status of the lift device.

Another exemplary implementation of the present disclosure relates to a fleet connectivity system. The fleet connectivity system includes a user device and a lift device. The lift device comprises an implement, a prime mover configured to drive the implement, and a connectivity module communicably coupled with the lift device. The connectivity module is configured to receive an input relating to a status of the lift device, and provide an indication representing the status of the lift device. Further, a user provides the input to the user device, and the user device is configured to communicate the input to the connectivity module.

Another exemplary implementation of the present disclosure relates to a method of providing a status of a lift device. The method includes receiving an input relating to the status of the lift device, where the input includes a status of the lift device desired by a user and an indication representing the status of the lift device desired by the user. The method further includes determining the status of the lift device based on the input, and providing, via an indicator, an indication representing the status of the lift device to an observer.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
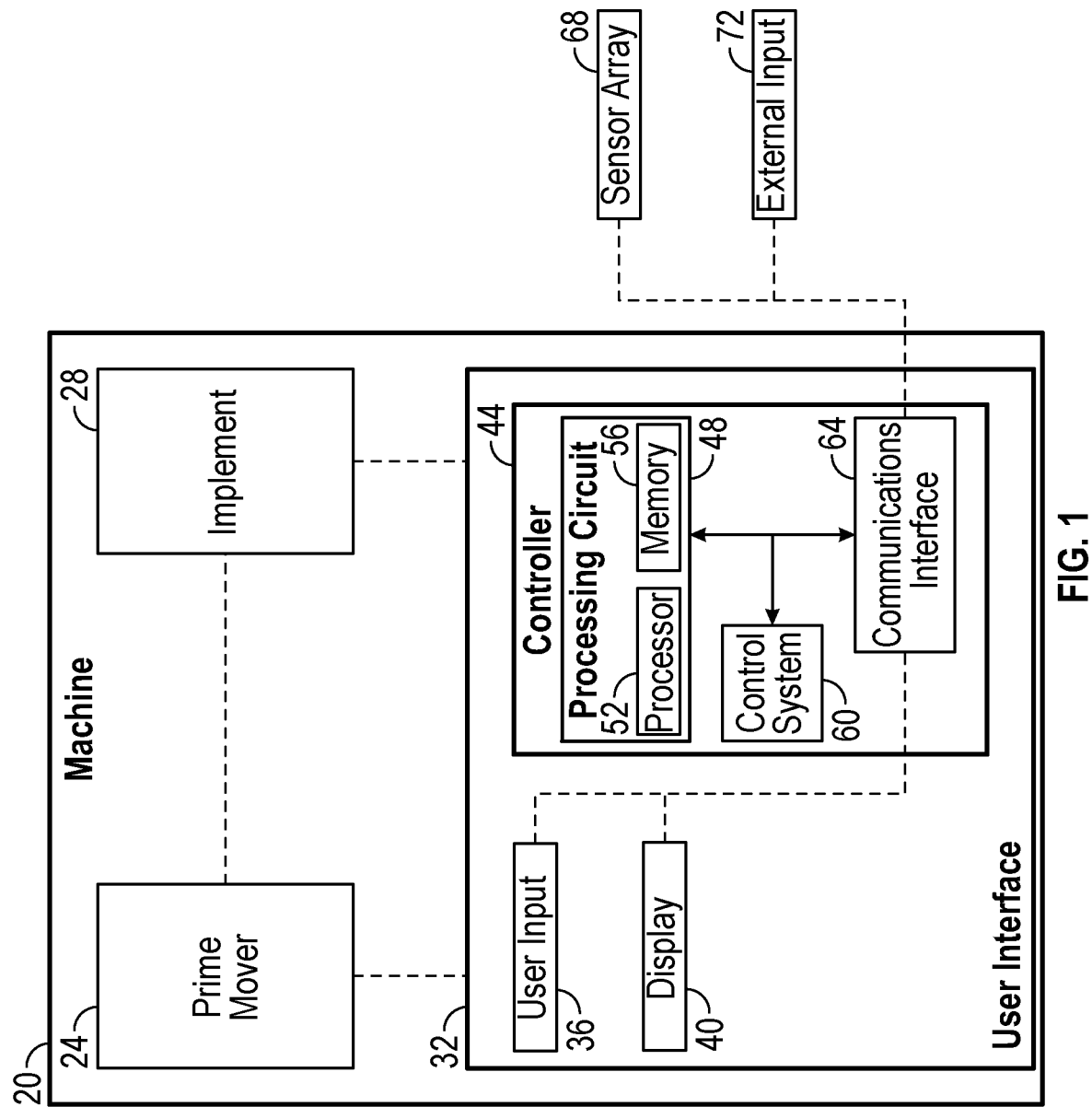
FIG. 1 is a schematic representation of a work machine including a machine control module, according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Work equipment such as lifts and telehandlers sometimes require tracking, tasking, monitoring, and servicing at a work site. Managers and operators of working machines typically rely on discrete systems, applications, and methods to perform these functions for each piece of equipment. Often, physical inspection (e.g. hands on inspection by a person) of a machine is necessary to determine a state or a condition of the machine. Additionally, on work sites encompassing a large area or involving many pieces of equipment, it is often difficult for equipment operators or service technicians to locate a particular piece of equipment to which they are assigned. It is therefore desirable to provide a means to quickly and effectively identify a particular machine and the state or status of the machine to a user thereby saving time, improving efficiency, and reducing costs.

Referring to the figures generally, various exemplary embodiments disclosed herein relate to systems and methods for providing a status indication of a work machine (e.g., lift device, articulating boom lift, telescoping boom lift, compact crawler boom list, telehandler, scissor lift, toucan mast boom lift, etc.). As described herein, it is contemplated that the systems and methods described may be readily applied to various systems, machines, equipment, devices, etc. without departing from the teachings of the present disclosure. According to an exemplary embodiment, a machine includes a connectivity module communicably coupled with the machine, the connectivity module is configured to receive an input relating to the status of the machine, and provide an indication representing the status of the machine. In some embodiments, the indication is provided via an indicator that is communicably coupled to the connectivity module. The indicator may be integrated with the connectivity module (e.g., an integrated light, beacon, etc.), or the indicator may be separate from the connectivity module, for example a separate device (e.g., a light, beacon, etc.), a component of the work machine (e.g., a headlight, horn, etc.), or any other suitable indication device. In an exemplary embodiment, the indicator is configured to function when the machine is off (e.g., Bluetooth low energy may always be active via power input from a battery, may communicate at a reduced duty cycle, etc.). Further, the connectivity module and/or the indicator may be communicably connected to other machines and/or devices via Bluetooth Low Energy (BLE) Machine to Machine (M2M) communication protocols at a work site/jobsite at which a local fleet connectivity system is deployed, as discussed below.

According to an exemplary embodiment, the indicator is configured to provide, and/or the indication may be, a visual indication (e.g., a light that is colored, patterned, includes other visual characteristics), an audio indication (e.g., noise, alarm, warning, message, etc.), a tactile indication (e.g., vibration, etc.), another other suitable indication (e.g., a message to the user device, an icon on an application, an icon on a graphical user interface, etc.), and/or any combination thereof. According to an exemplary embodiment, the indication represents the status of the machine. The status of the machine may be a state or condition of the machine (e.g., a fuel level, battery charge, the position/orientation of a component of the machine, whether the machine is on or off, whether the machine is in operation or moving, etc.), a quality of the machine (e.g., the machine requires a charge, a diagnostic check, a trouble shooting check, maintenance is required, DTC, etc.), a characteristic of the machine (e.g., machine type, model, work site tag, etc.), and/or any other suitable machine characteristic desired to be determined by a user and/or observer. In this regard, the systems and machines described herein allow a user to quickly and effectively identify particular machine statuses via indicators, so as to save time, improve efficiency, and reduce cost in ordinary workflow.

Further referring to the figures generally, the various exemplary embodiments described herein relate to systems, apparatuses, and methods for a fleet connectivity system interoperable with a work machine. As described herein, it is contemplated that the systems and methods described may be readily applied to various systems, machines, equipment, devices, etc. without departing from the teachings of the present disclosure. For example, the fleet connectivity system may include work machines, interface modules, work site equipment, communications devices, communications networks, user interface devices, devices hosting a fleet connectivity system software, equipment users, equipment maintainers, equipment suppliers, visual indication systems, etc. According to an exemplary embodiment, the fleet connectivity system includes a user device having an application that enables a user to request (e.g., select, input, provide, etc.) a status indication (or status indications) from one or more work machines in a fleet. For example, a user may select a charge status as the desired status of the machine, and the user device (e.g., the application) may communicate the request the one or more machines in a fleet. The work machine or machines (e.g., the connectivity module) may receive the request in the form of an input, and determine the desired status via components of the work machine (e.g., sensors, processors, control systems, etc.). Once the machine or machines has determined the status, each machine may provide an indication (e.g., visual, audio, tactile, etc.) representing the status of that specific machine to a user, as discussed above. For example, it may be determined that one work machine in the fleet has a charge status of 90%, which may be indicated via a visual flashing green light; seven work machines in the fleet have a charge status of 50%, which may be indicated via a yellow flashing light; and fifteen of the work machines in the fleet have a charge status of less than 25%, which may be indicated via a red light. In this sense, the various indications may allow a user to quickly identify the work machine (or machines) in a fleet that satisfy the user's requirements.

In some embodiments, the application includes additional features. For example, the application may include an interface having a graphic display of a machine population, a map showing a current machine location, a machine status, etc., a map showing color coded indicators representing the statuses of various machines in a fleet, etc. The application may include dynamic filters that may be applied to a machine population, for example to identify a particular machine population or sub-population of machines at one or more work sites based on a desired characteristic (e.g., machine type, machine model number, machine manufacturer, machine location, machine work site tag, machine status, fuel status, use status, etc.). The application may be presented via a user interface on a work machine, a user device, a remote device, and/or any other suitable device configured to host an application.

According to an exemplary embodiment, the systems, machines, and methods described herein may include one or more processing circuits comprising one or more memory devices coupled to one or more processors, the one or more memory devices configured to store instructions thereon that, when executed by the one or more processors, cause the one or more processors to: communicate across a wireless network by sending messages across nodes that are created by different machines and extend a connection with one nearby machine to a network of machines to connect to various machines across a work site. The fleet connectivity system then automatically identifies equipment connected to the network of machines. In some embodiments, the connectivity module and/or the indicator may be supported by an ad hoc machine to machine network. In some embodiments, the connectivity module and/or the indicator may be supported by a self-organizing network on a work site. In some embodiments, the communications means between machines connected to the network of machines may comprise wired networking, short range radio frequency networking (e.g. Bluetooth, Bluetooth Low Energy, WiFi, VHF, or UHF), optical communications networking, or long range radio frequency networking (e.g. satellite communications). In some embodiments, the network of machines may be a mesh network. In some embodiments, access to machine-specific data from machines connected to the network of machines may be associated with one or more codes (e.g. a customer key).

As shown in FIG. 1, a work machine 20 (e.g., lift devices, an articulating boom lift, a telescoping boom lift, a compact crawler boom lift, a telehandler, a scissor lift, a toucan mast boom lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a controller 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the controller 44 includes a processing circuit 48 having a processor 52 and a memory device 56, a control system 60, and a communications interface 64. Generally, the controller 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the work machine 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the controller 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near network to one or more other work machines 20. In some embodiments, the automatic associations are based on rule stored on a work machine or on another network node. In some embodiments, the association rules are based on one or more of a work site designation, a location of a machine, or a code (e.g. a customer key, a manufacturer key, or a maintainer key).

Figure 2:
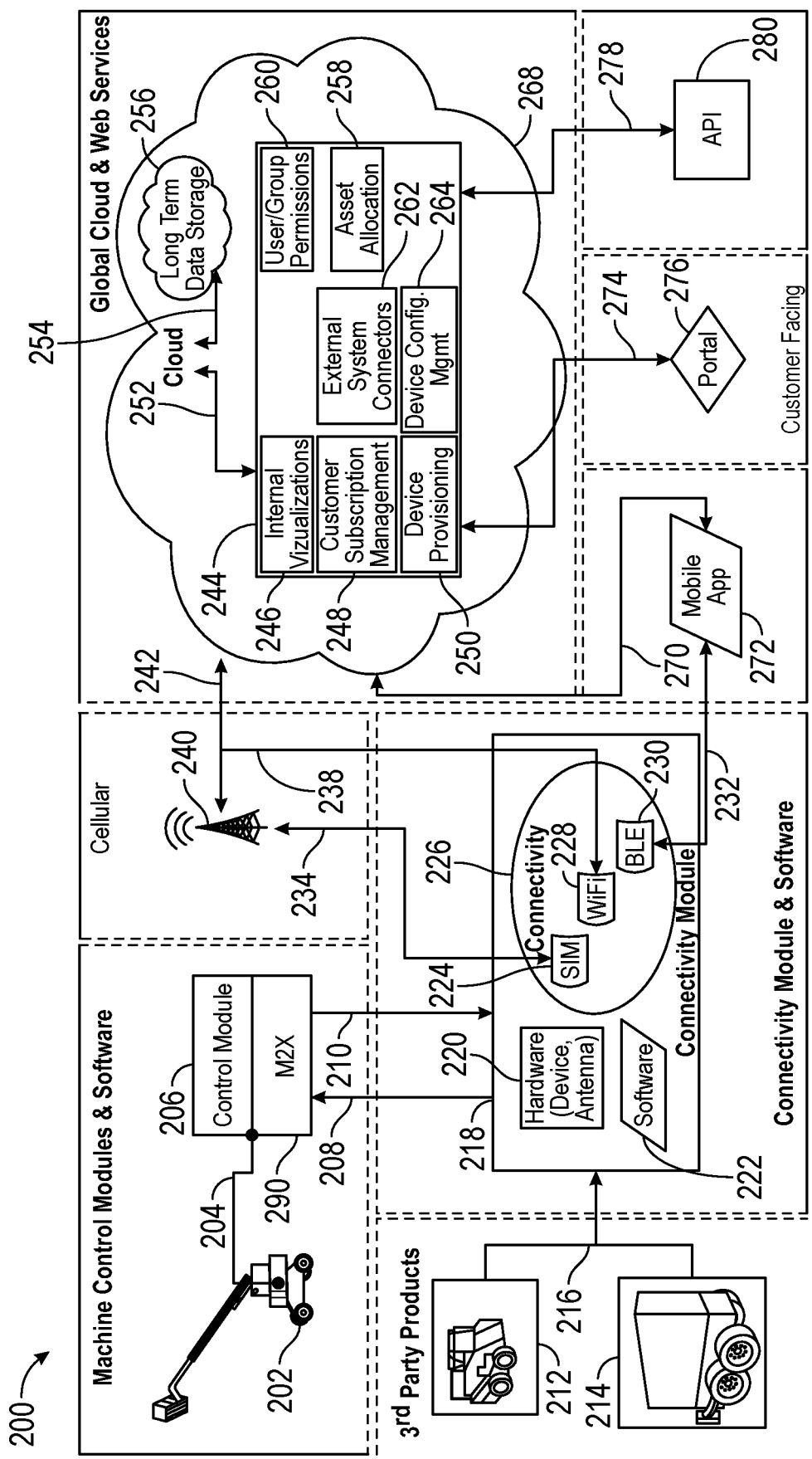
FIG. 2 is a schematic representation of a local fleet connectivity system, according to some embodiments.

As shown in FIG. 2, a local fleet connectivity system 200 is supported by a network of nodes. The network of nodes may include one or more work machines 202, each with a control module 206, one or more connectivity modules 218, and one or more network devices hosting, for example, user interfaces, network portals 276, application interfaces/application programming interfaces 280, data storage systems 256, cloud and web services, and product development tool and application hubs 244.

The work machine 202 is communicably connected to a control module 206. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via connection 216 to products (e.g. third party work machines 212, 214) not configured by the original product manufacturer with a control module 206.

The work machine 202 communicably connects to the local fleet connectivity system 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the local fleet connectivity system 200. Applications providing functions for the local fleet connectivity system 200 may be run by the M2X modules on one or more work machines 202 exchange commands, codes (e.g. a customer key) and data between work machines 202, 212, 214, and user devices 272, including user interfaces, to form a network of interconnections among machines, devices, or nodes. Connections between machines and user devices in the local fleet connectivity system 200 may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, WiFi, cellular, optical, and satellite communications. The connectivity module 218 may function as a gateway device connecting work machine 202 to other work machines 212, 214, remote networks 268, 272, 276, and 280, beacons, scheduling or other fleet management and coordination systems.

The local fleet connectivity system 200 allows for the coordination of multiple work machines 202, 212, 214 within the same work site, or a fleet wide control. For example, a work machine 202 may remotely report the results of a self-inspection to a user via a user device 272 (e.g., including a user interface).

The local fleet connectivity system 200 provides connectivity between work machines 202, 212, 214 and remotely hosted user interfaces (e.g., on user device 272), network portals 276, application interfaces/application programming interfaces 280, data storage systems 256, cloud and web services (e.g., remote network 268), and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the local fleet connectivity system 200 may comprise, for example, cellular networks (e.g., via cell towers 240), or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc.

Figure 3A:
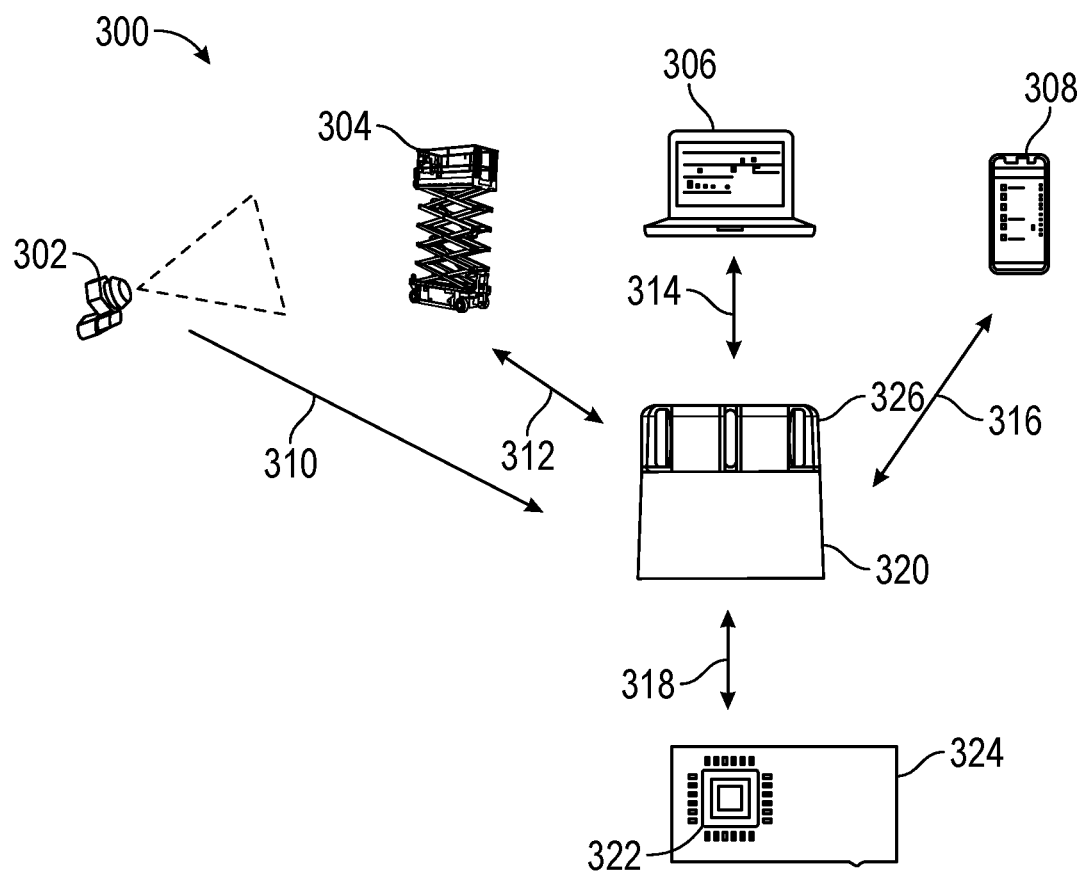
FIG. 3A is a schematic representation of a local fleet connectivity system with a connectivity module and an indicator, according to some embodiments.
Figure 3B:
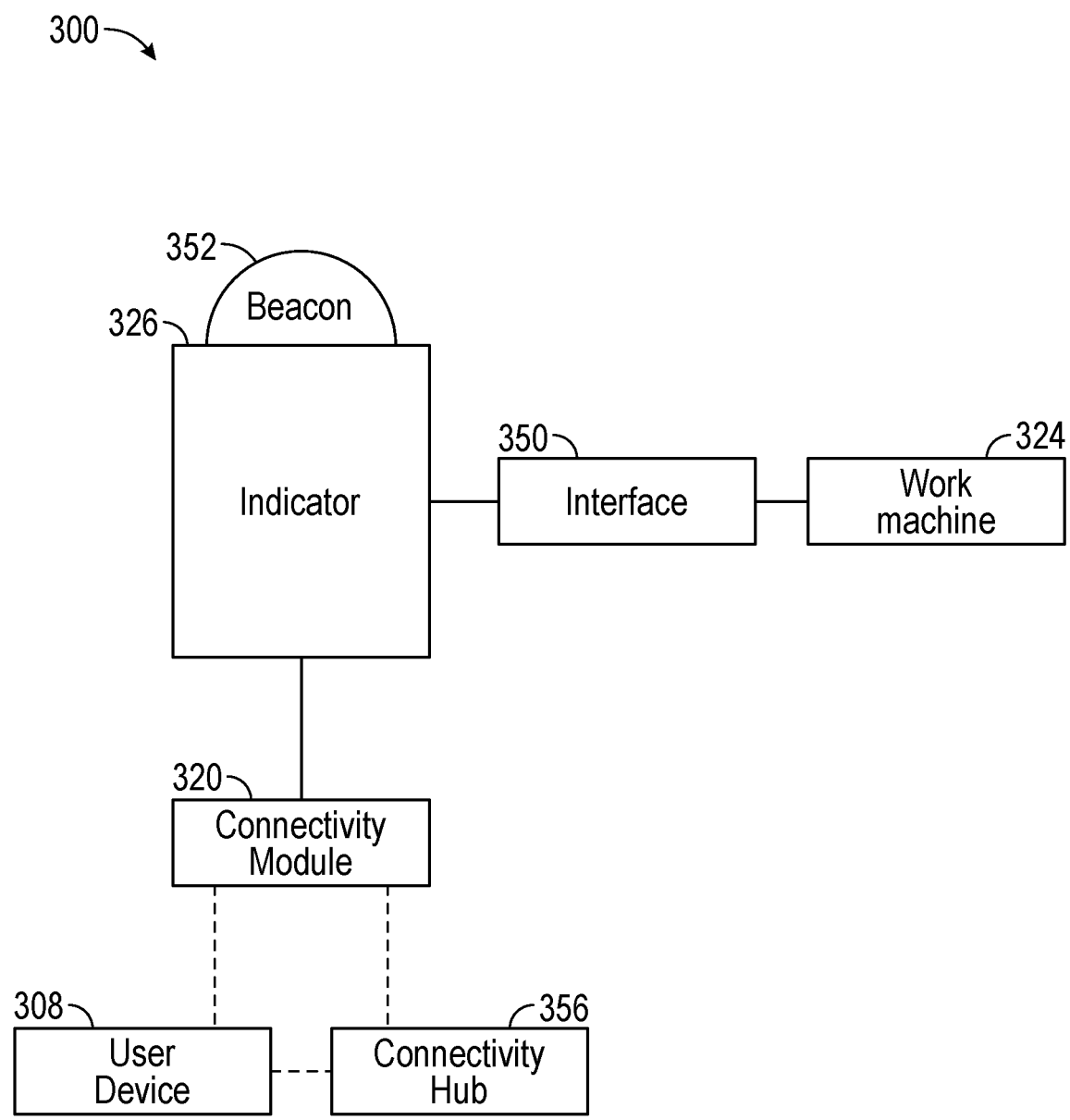
FIG. 3B is another schematic representation of a local fleet connectivity system with a connectivity module and an indicator, according to some embodiments.

Referring to FIGS. 3A-3B, a local fleet connectivity system 300 is shown, according to an exemplary embodiment. As shown in FIGS. 3A-3B, a connectivity module 320 functions as a communications interface between a work machine 324 (e.g., a control system) and other elements connected to the local fleet connectivity system 300, as discussed below. The connectivity module 320 may be part of the work machine 324, may be physically coupled to the work machine 324, and/or may be configured to communicate with the work machine 324 (e.g., via an interface 350 as shown in FIG. 3B). In some embodiments, the connectivity module 320 is integrated with other components of the work machine 324 (e.g., a control system, a controller, another component, etc.). In an exemplary embodiment, the connectivity module 320 is configured to exchange data and/or commands 318 with a control system 322 of the work machine 324, data and/or commands 316 with a user device 308 running an application for the local fleet connectivity system 300, data and/or commands 314 with a node or portal 306, data and/or commands 312 with another machine 304, sensor data 310 with auxiliary sensors 302, data with a connectivity hub 356 (shown in FIG. 3B) configured to connect a plurality of machines to the local fleet connectivity system 300, and/or any other suitable commands and/or data with another suitable working device or machine.

In an exemplary embodiment, the connectivity module 320 includes an equipment indicator, shown as indicator 326. The indicator 326 may provide an indication or signal to a user or observer, for example an indication or signal regarding a status of a machine, as discussed below. The indicator 326 may be configured, for example, as a mode of the local fleet connectivity system 300. In an exemplary embodiment, the indicator 326 is integrated with the connectivity module 320 (as shown in FIG. 3A); however, in other embodiments the indicator 326 is in communication with the connectivity module 320 (as shown in FIG. 3B), and/or integrated with another component of the local fleet connectivity system 300 (e.g., the work machine 324, etc.). For example, the indicator 326 may be a machine component (e.g., a headlight, horn, taillight, etc.) and/or a separate device of the work machine 324 (e.g. an external machine light, an internal machine light, a horn, etc.). In yet other embodiments, the indicator 326 includes and/or is integrated with a beacon 352 (as shown in FIG. 3B). The indicator 326 may be a light or lighting device (e.g. an incandescent light, a light emitting diode, a fixed beacon, a flashing beacon, a rotating beacon, a laser, a light array, etc.), a display device (e.g., display screen, application, mobile device, sign, etc.), a marker, another suitable indicator, etc. In some embodiments, the indicator 326 incorporates an audible indication of a machine status (e.g., an alarm, a message, etc.).

Figure 3C:
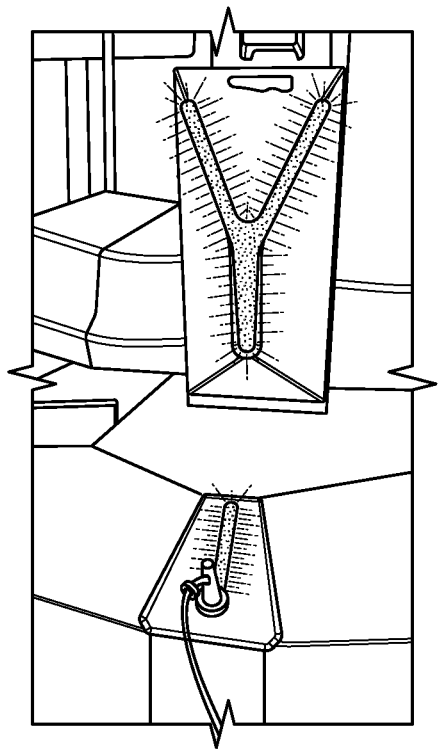
FIG. 3C is an illustrative implementation of the indicator of FIGS. 3A-3B, according to some embodiments.
Figure 3D:
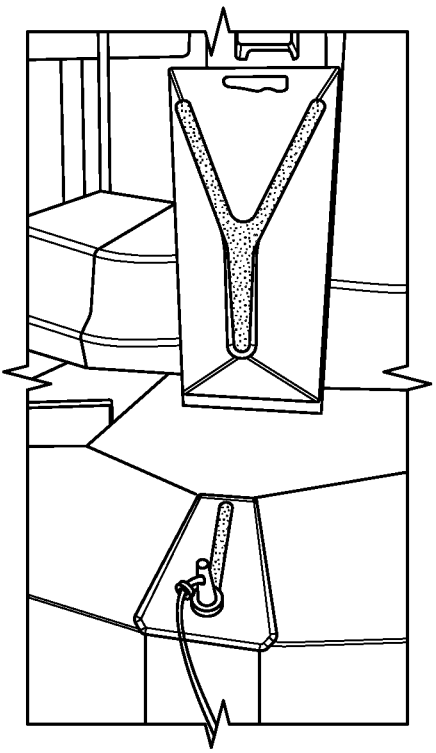
FIG. 3D is another illustrative implementation of the indicator of FIGS. 3A-3B, according to some embodiments.
Figure 3E:
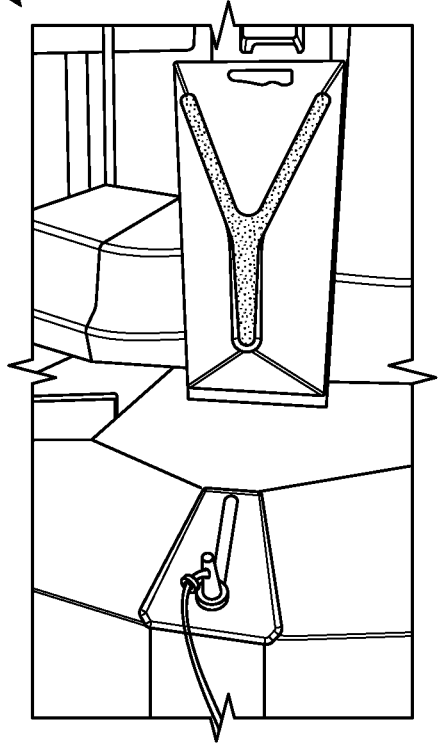
FIG. 3E is another illustrative implementation of the indicator of FIGS. 3A-3B, according to some embodiments.
Figure 3F:
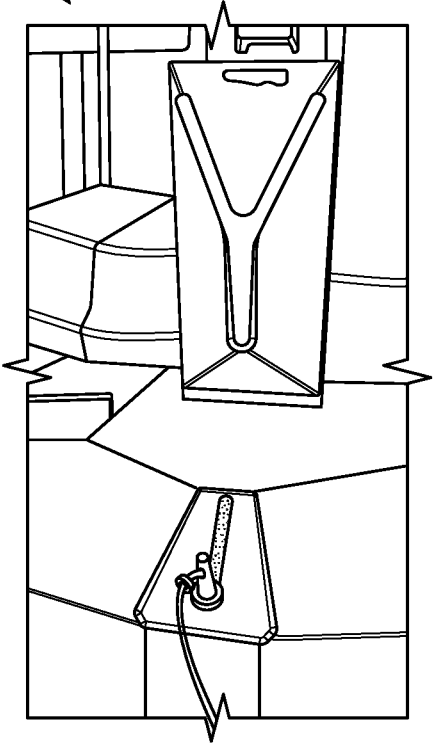
FIG. 3F is another illustrative implementation of the indicator of FIGS. 3A-3B, according to some embodiments.

In an exemplary embodiment, the indicator 326 is configured to generate a variety of indications and/or signals, for example visual, audible, tactile, etc. signals. In some embodiments, the indicators includes visual signals that comprise one or more colors (e.g., white, red, blue, green, orange, etc.), patterns (solid, flashing, strobed, etc.), and/or any other suitable combination of colors and/or patterns. For example, the indicator 326 may include a flashing visual indicator (as shown in FIG. 3C), a solid or consistent state indicator (as shown in FIG. 3D), a combination of flashing visual indicators and/or consistent state indicators (as shown in FIGS. 3E-3F), or any combination thereof. As will be discussed in greater detail below, each indication/signal provided by the indicator 326 may represent a different machine status (or the status of a component thereof). In some embodiments, the visual patterns generated by the indicator 326 can be varied in any optical characteristic (e.g. color, wavelength, intensity, pulse duration, direction, etc.). In other embodiments, the indicator 326 is configured to generate an audible indicator (e.g., a noise, alarm, warning, message, etc.), a tactile signal (e.g., vibration, etc.), and/or any other suitable indicator or signal (e.g., a message to a user device, an icon on an application, etc.).

According to an exemplary embodiment, the indicators and/or signals provided by the indicator 326 indicate various statuses (e.g., states, conditions, criteria, etc.) of a machine. The signals may indicate, for example, a fuel level of a machine, the status of a component of the machine (e.g., retracted, extended, open, closed, etc.), whether the machine is on or off, whether the machine is in operation or moving (as shown in FIG. 3C), a charge level of the machine, whether the machine is charging and/or charged (as shown in FIG. 3E), etc. In some embodiments, the signals indicate predefined and/or user configurable machine states. For example, a machine (e.g., the indicator 326) may provide an indication that it requires a charge, a diagnostic check, a trouble shooting check, maintenance is required, DTC, etc. In other embodiments, indicators and/or signals are different and/or similar depending on characteristics of the machines (e.g., machine type, model, work site tag, etc.). According to an exemplary embodiment, the indicator 326 may provide an indication in response to a local user command entered by a user at the user device 308, a condition and/or state detected by an onboard sensor of the work machine 324, a determination from the control system 322, a remote user command entered at the node or portal 306, a machine to machine command (e.g., another machine 304), as a result of communication from the connectivity hub 356, etc., as discussed below.

According to an exemplary embodiment, the indicator 326 is configurable to function when work machine 324 is off (e.g., powered off, out of battery, out of fuel, etc.). The indicator 326 may be configured to receive input (e.g., sensor input from the work machine 324, user input from the user device 308, fleet input from the connectivity hub 356, as discussed below, etc.) via a Bluetooth low energy (BLE) signal received at the connectivity module 320. The BLE communications path can be configured to remain active with power input from another power source (e.g. a battery, etc.). In some embodiments, the BLE communications channel in the connectivity module 320 remains open, and the indicator 326 is available to display a signal in a power saving mode (e.g. modified receiver duty cycles, reduced communications/BLE intervals, lower power operation of the indicator 326, etc.).

As discussed briefly above, a machine onboard sensor (or sensors) may detect a status of the work machine 324. As shown in FIG. 3A, the control system 322 may provide data to the connectivity module 320 (and/or directly to the indicator 326) for the indicator 326 to display one or more indicators and/or signals representative of a detected state or condition of the work machine 324. In some embodiments, the control system 322 provides data to the connectivity module 320 (and/or the indicator 326) based on user preferences, manufacturer preferences, regulatory thresholds, and/or any other suitable determination provided to the control system 322. According to an exemplary embodiment, the indicator 326 illuminates a visual signal corresponding to a machine state or condition based on preferences programmed in the control system 322 (e.g., as shown in FIGS. 3C-3F). For example, the indicator 326 may provide a green signal to indicate a fuel level above ¾ is sensed, yellow to indicate a fuel level between ¾ and ¼ is sensed, and red to indicate a fuel level below ¼ is sense. In some embodiments, the indicator 326 may provide a visual indication relating to the battery charge of a machine based on user or manufacturer thresholds (e.g., illuminate a top light if the control system 322 determines the charge is above a user or manufacturer preferred threshold, flash a top light if the control system 322 detects a battery charge below a different threshold, etc.).

Although fuel levels and battery charges are described herein, it is understood that the components of the work machine 324 may determine, and/or the indicator 326 may provide, an indication relating to any other statuses, state, and/or condition of the work machine 324 (e.g., power status, operational status, diagnostic status, etc.) based on any suitable threshold and/or preference (e.g., user, manufacturer, regulatory, etc.). For example, the control system 322 may be configured to receive information relating to (e.g., via a sensor, sensors, etc.) and/or determine the position of the work machine 324 relative to a floorplan, the position of the work machine 324 on a network (e.g., a mesh network) relative to the user device 308 and/or another machine 304, pressures of various components of the work machine 324 (e.g., a platform, a fork, a chassis, a wheel, etc.), loads on various components of the work machine 324 (e.g., platform, chassis, wheel, etc.), heights of various components of the work machine 324 (e.g., a platform, a fork, a chassis, a wheel, etc.), etc., and/or any combination thereof.

In some embodiments, an application is presented to a user via a user interface on the user device 308. The application may be configured to receive input from a user via the user device 308 (e.g., user selections, preferences, etc.). In an exemplary embodiment, the input includes a machine status the user desires to evaluate (e.g., of the work machine 324, the other machine 304, a fleet of machines, etc.), and/or an indicator corresponding to the machine status the user desires (e.g., preferred visual signal, audio signal, etc.). For example, a user may select the state of charge of a machine as the desirable status, and one or more visual indicators (e.g. colored lights, etc.) that correspond to one or more states of charge (e.g., over ¾ charged, between ¾ and ¼ charged, less than ¼ charged, etc.). The input information may then be transmitted to the work machine 324, the other machine 304, and/or any other machine in a fleet via a network. According to an exemplary embodiment, the control system 322 of the work machine 324 is configured to receive the user input, determine the status of the work machine 324 based on the user input (e.g., via sensors, the control system 322, etc., as discussed above), and provide one or more commands/data to the connectivity module 320 (and/or the indicator 326) relating to the status of the work machine 324. The connectivity module 320 (and/or the indicator 326) may then provide an indication of the status of the work machine 324, for example based on the desired indicator from the user. In some embodiments, the user input (e.g., the desired status of the machine, the desired indicator, etc.) is communicated directly from the user device 308 to the connectivity module 320 (e.g., as shown in FIG. 3A). As such, in some embodiments the connectivity module 320 may further communicate the user input to the control system 322 to determine the status of the work machine 324 (as discussed above), and/or the connectivity module 320 may itself determine the status of the work machine 324.

As an illustrative example, a user may input the state of charge as the desirable machine status into the user device 308 (e.g., an application, etc.). The user device 308 may then communicate the user input to the control system 322 of the work machine 324 (e.g., via the network), the control system 322 may determine the charge status of the work machine 324 (e.g., via sensors, processors, etc.), and the control system 322 may communicate the charge status of the work machine 324 to the connectivity module 320. Based on the information from the control system 322, the connectivity module 320 (e.g., the indicator 326) may provide an indication and/or signal (e.g., a colored light, a beacon, etc.) that represents the charge status of the work machine 324 (e.g., a green light indicating a good charge status, a yellow light indicating a recharge is required, a red light indicating a low charge status). In some embodiments (e.g., shown in FIGS. 3A-3B), the user device 308 communicates the user input directly to the connectivity module 320. The connectivity module 320 may then communicate the user input to the control system 322 to determine the charge status of the work machine 324, as discussed above. However, in other embodiments the connectivity module 320 is configured to receive the user input from the user device 308, determine the status of the work machine 324 (e.g., the charge status, etc.), and provide (e.g., via the indicator 326) an indication and/or signal of the status of the work machine 324. It should be understood that while the application is described as being presented on a user interface of the user device 308, it is appreciated that a user may provide input information (e.g., relating to a desired machine status, indicator, preferences, etc.) via any other suitable device (e.g., the node or portal 306, a computer, tablet, desktop) and/or application.

According to an exemplary embodiment, the components of the local fleet connectivity system 300 allow for the coordination of a plurality of machines within the same work site, fleet, etc. (e.g., the work machine 324, another machine 304, etc.). For example, the work machine 324 and another machine 304 may include connectivity modules 320, and may be communicably connected to the connectivity hub 356. As will be discussed in greater detail below, the connectivity hub 356 may be configured to communicably connect one or more connectivity module equipped machines (e.g., to increase communication, efficiencies, etc.). According to an exemplary embodiment, a user provides an input (e.g., via the user device 308) to the connectivity hub 356, the input relating to a status of a machine and/or an indicator corresponding to the status of a machine, as discussed above. The connectivity hub 356 may be configured to receive the input, and communicate the input to the connectivity modules 320 of the plurality of machines in the fleet, or other components of the machines (e.g., a control system, controller, etc.). The connectivity modules 320 (e.g., the indicators 326) of the work machines may then provide an indicator of a state or condition of the machines based on the user input, as discussed above.

For example, a user may provide an input (e.g., via the user device 308) to the connectivity hub 356, the input including a request to indicate all machines in a fleet that have a charge status of over 50%. The connectivity hub 356 may communicate the input and/or command to the plurality of machines (e.g., plurality of connectivity modules 320, a plurality of control systems 322, etc.). The machines (e.g., the control system 322) and/or the connectivity modules 320 may receive the input, and determine the state or condition (e.g., the charge status) of the respective machine. Further, based on the state or condition of the machines, the indicators 326 may provide an indication that represents the state or condition of each machine (e.g., a green light indicating a charge status over 50%, a yellow light indicating a charge status under 50% but above 25%, a red light indicating a charge status less than 25%, etc.). In this regard, a user may easily identify the statuses of a plurality of machines in a fleet, so as to increase efficiency and/or productivity. Although the above example describes user input that relates to battery charge of machines in a fleet, it is contemplated that the user input may include any suitable input and/or indicator. For example, an input may relate to another state or condition (e.g., fuel, service status, fault detection status, etc.), machine type (e.g., make, model, year, etc.), machine location (e.g., proximity to a user, proximity to a task, positioned for an easiest movement out of a staging area, etc.), etc.

As indicated briefly above, in some embodiments the connectivity hub 356 and/or the connectivity modules 320 also allow a plurality of work machines to more efficiently complete a task in collaboration. For example, a user may provide an input (e.g., via the user device 308) to the connectivity hub 356, the input including instructions and/or a request to accomplish a task. The connectivity hub 356 may communicate the input and/or commands to the work machine 324 and other machines in the fleet in order to complete the task. The work machine 324 (e.g., the control system 322, etc.) and/or the other machines may process the input, determine the steps necessary to complete the task, and/or provide an indication (e.g., via the indicators 326) relating the machine and/or the steps of the task.

For example, a user may request (e.g., via the user device 308) that five devices in a fleet be at a specific location on a campus as quickly as possible. The input may be communicated to the connectivity hub 356, which may further be communicated to the machines (e.g., the connectivity modules 320) in the fleet. The machines and/or the connectivity modules 320 may receive the input, and provide an indication of the machines' status relative to the request. For example, the work machine 324 (e.g., the indicator 326) may indicate that the work machine 324 is powered off, not moving, in neutral, etc., such that the other machine 304 may more quickly make it to the requested location on campus. Further, the work machine 324 (e.g., the indicator 326) may indicate that the work machine 324 is low on fuel, battery power, etc., such that the other machine 304 may determine the other machine 304 may make it to the specific location with sufficient fuel, battery power, etc. to complete the task. In some embodiments, the auxiliary sensors 302 are also configured to communicate with the connectivity hub 356 and/or the connectivity module 320 so as to permit one or more machines to complete tasks more efficiently. For example, the auxiliary sensors 302 may sense information relating to the machines (e.g., temperature, location, proximity, height, orientation, etc. relating to the work machine 324, the other machine 304, etc.), and/or communicate the machine information to the connectivity module 320 and/or the connectivity hub 356.

Figure 4:
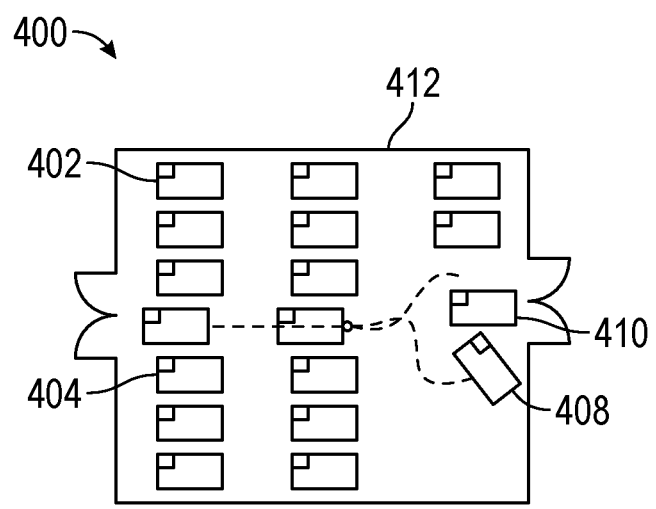
FIG. 4 is a schematic representation of a work site and equipment staging area with a fleet connectivity system deployed, according to some embodiments.

Referring now to FIG. 4, a fleet connectivity system 400 is shown, according to an exemplary embodiment. As discussed above, the fleet connectivity system 400 may be deployed at a work site 412 to control a fleet of work machines 402, 404, 408, 410, so as to collaboratively perform tasks requiring more than one work machine 408, 410. For example, a user may wish to move the work machine 410 from its stored position on the left of the work site 412 out the door on the right of the work site. Components of the fleet connectivity system 400 (e.g., a network access point, a system access point, a connectivity hub, work machines having a connectivity module, etc.) may communicate with both the work machine 408 and the work machine 410, causing the work machine 408 to move out of the way of the work machine 410, so that the work machine 410 can move past the work machine 408 and out the doorway.

Figure 5:
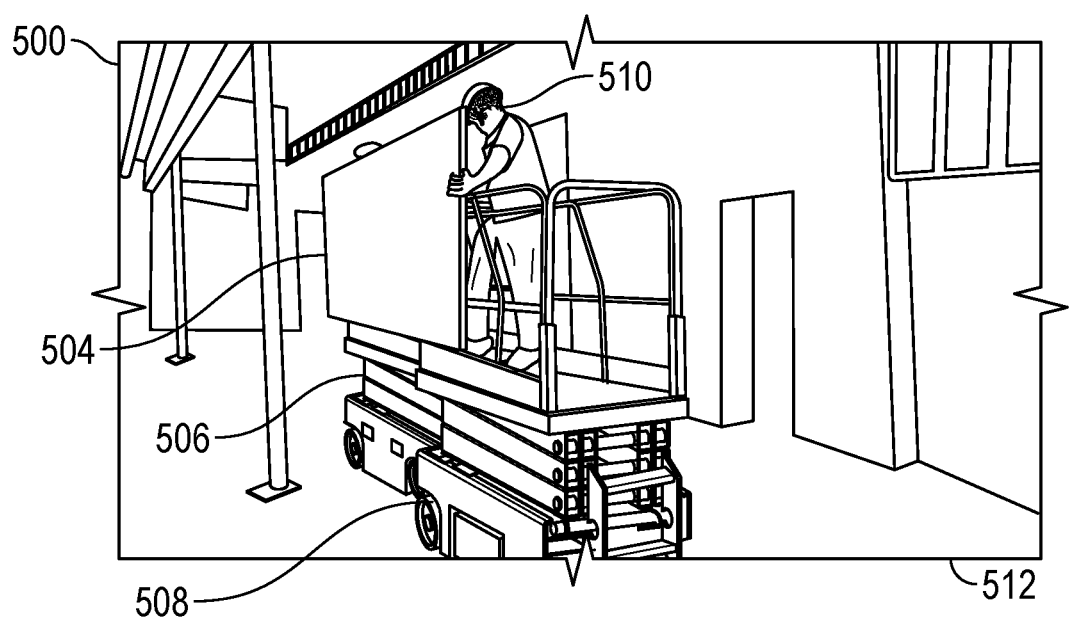
FIG. 5 is an illustrative representation of a work site with a fleet connectivity system connecting two pieces of equipment, according to some embodiments.

Referring now to FIG. 5, a fleet connectivity system 500 is shown, according to an exemplary embodiment. As discussed above, the fleet connectivity system 500 may be communicably coupled to a plurality of work machines 506, 508 (e.g., via a plurality of connectivity modules), such that the work machines 506, 508 may collaboratively perform tasks on a jobsite 512. For example, as shown in FIG. 5 the fleet connectivity system 500 may be used to replace a section of drywall 504 that is too large to be handled by a single work machine 508. Components of the fleet connectivity system 500 (e.g., a network access point, a system access point, a connectivity hub, etc.) may communicate with both the work machine 506 and the work machine 508, and cause them to move at the same speed and in the same direction so that a user 510 on each work machine 506, 508 may hold the drywall 504 while the work machines 506, 508 are moving. In this regard, communication between components of the fleet connectivity system and the work machines 506, 508 may prevent the work machines 506, 508 from being separated so that the users 510 do not drop the drywall 504.

Figure 6:
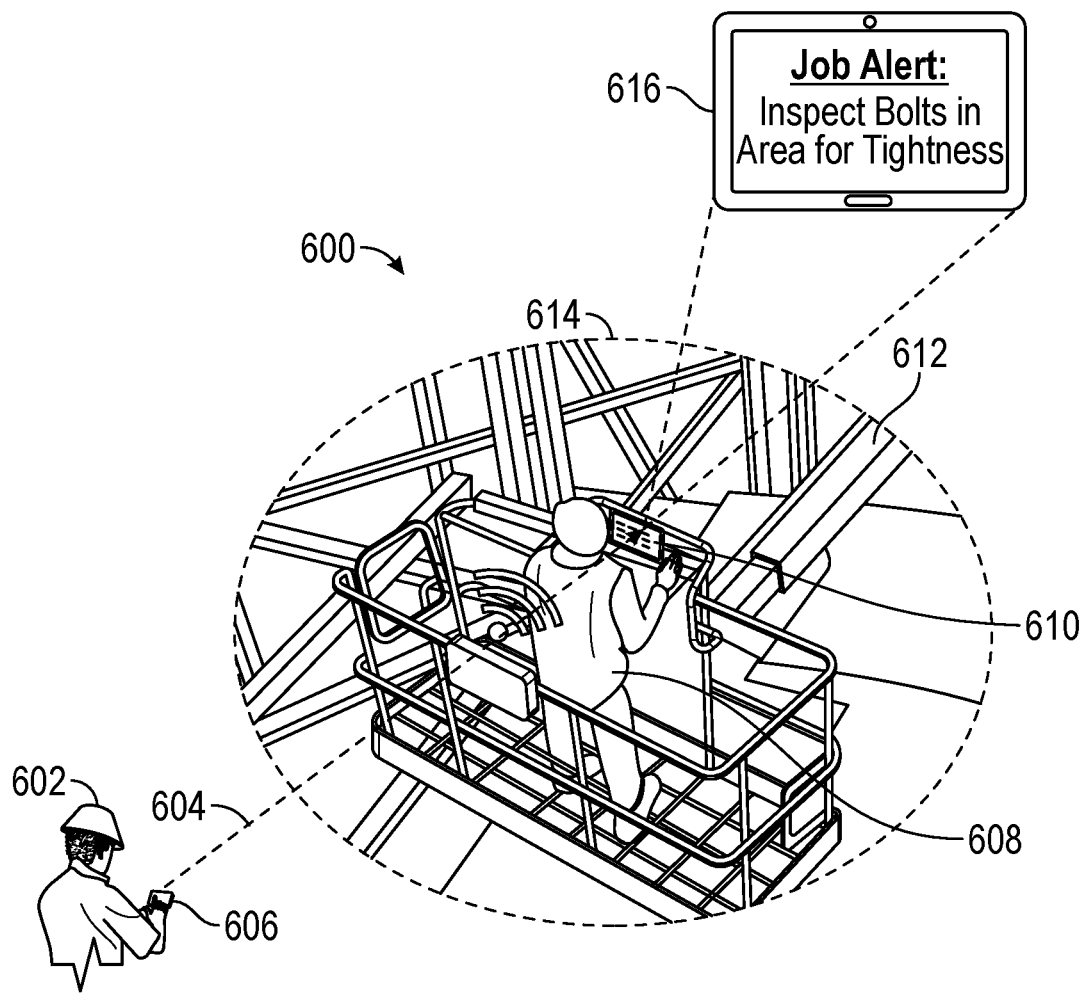
FIG. 6 is an illustrative representation of a piece of equipment with a fleet connectivity system providing connectivity to a remote user, according to some embodiments.

Referring now to FIG. 6, a remote user 602 of a fleet connectivity system 600 can send messages and data 604 from a remote device 606 to an onsite user 608 on a jobsite 614. The messages and data 604 may be received by the control system 610 of a work machine 612 and displayed via a user interface on an onboard display 616. The remote device 606 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
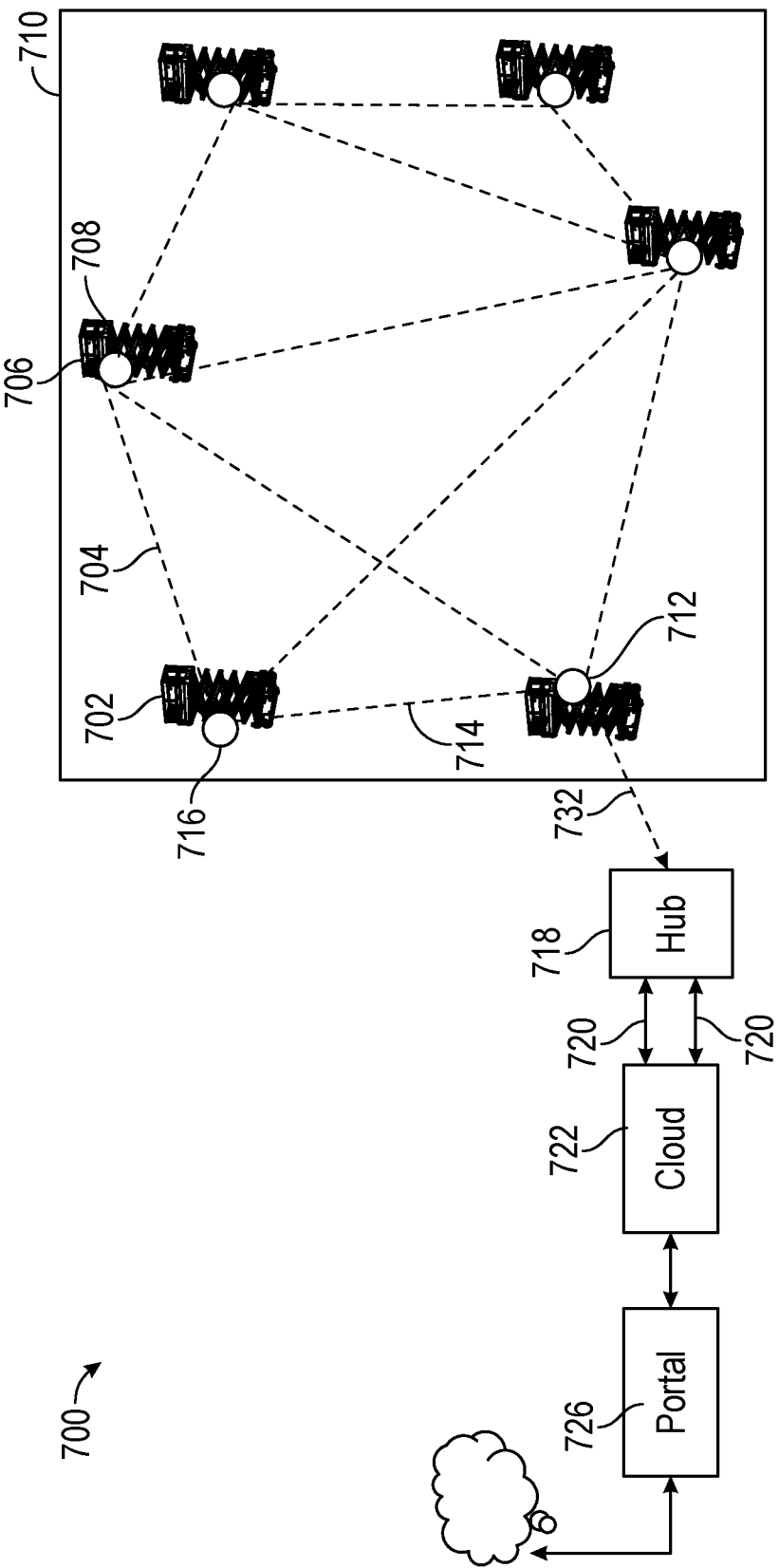
FIG. 7 is a schematic representation of a work site with a fleet connectivity system deployed with connectivity to off-site systems, according to some embodiments.

Referring to FIG. 7, a fleet connectivity network system 700 includes a connectivity hub 718. In some embodiments, the connectivity hub 718 includes and/or communications with a connectivity module. In some embodiments, the connectivity hub is configured to communicatively connect with one or more connectivity module equipped machines (e.g., work machines 702, 706) in proximity to the connectivity hub 718. In some embodiments, the connectivity hub is configured to broadcast a work site identification signal. In some embodiments, the connectivity hub is configured to connect work machines 702, 706 connected to the local fleet network to an external internet feed 720. In some configurations, the connectivity hub 718 is configured as a gateway to one or more communications systems or network systems to enable exchanges of data 720, 722 between nodes 708, 712, 716 on the work site 710 local fleet connectivity mesh network 704, 714, 732 and nodes 726 external to the work site. In some embodiments, connectivity hub has a connectively module that (a) provides the functionalities described here in place of or in addition to a machine that has a connectivity module, (b) broadcasts a site identifier, and/or (c) connects to an external internet to flow through data to and from the jobsite that is provided across the mesh.

Figure 8:
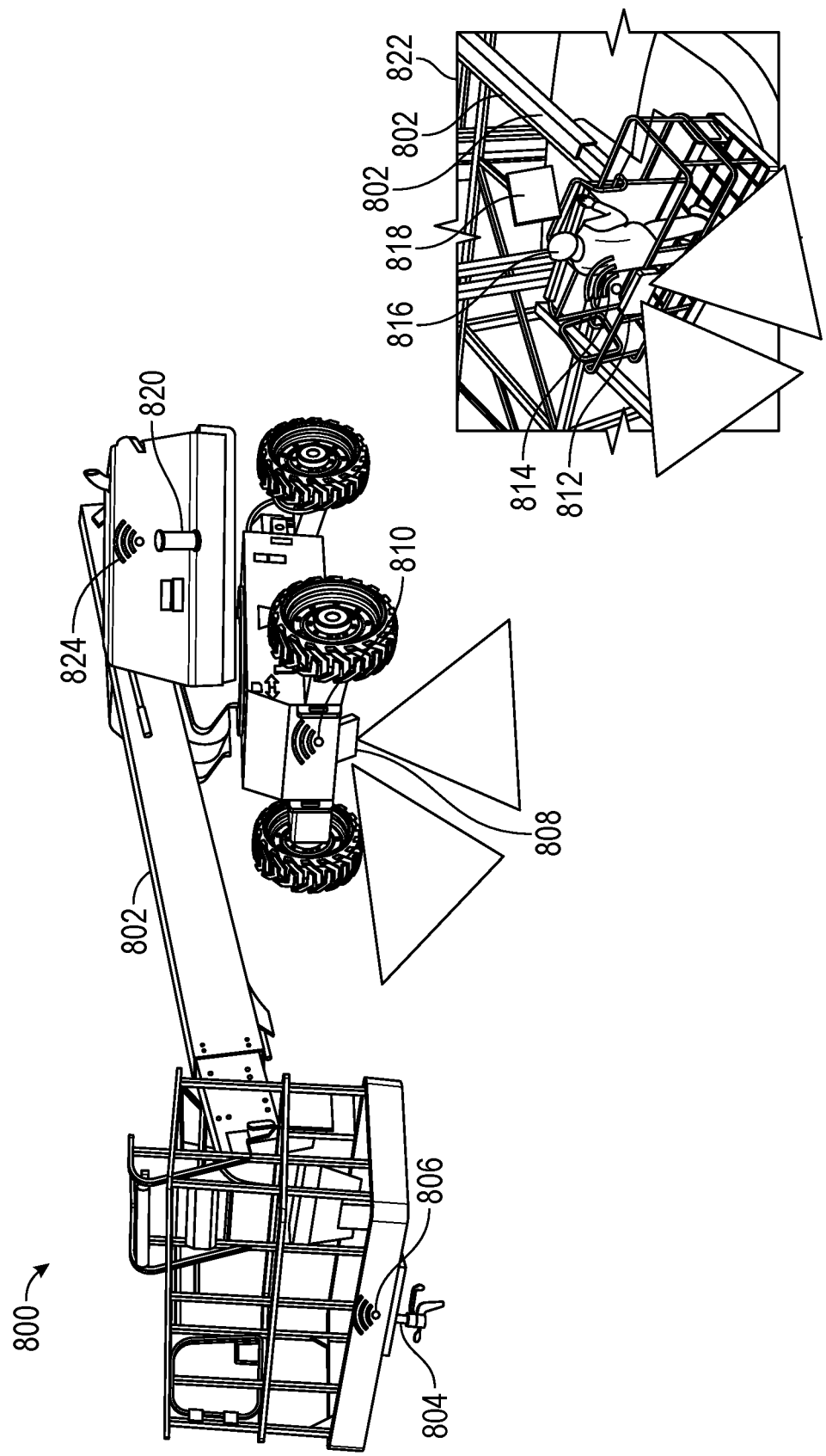
FIG. 8 is an illustrative representation of an apparatus configured with a fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to a fleet connectivity system via wireless connections 806, 810, 814, 824. The sensor data may be displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the fleet connectivity system (e.g., via a connectivity module 218). Sensor data from various work machines may be combined to map the jobsite 822, and to determine if environmental conditions are safe for using the work machines. Sensor data from the tagged consumable sensors 820 may be used to determine, for example, when tagged consumables must be replaced.

Figure 9:
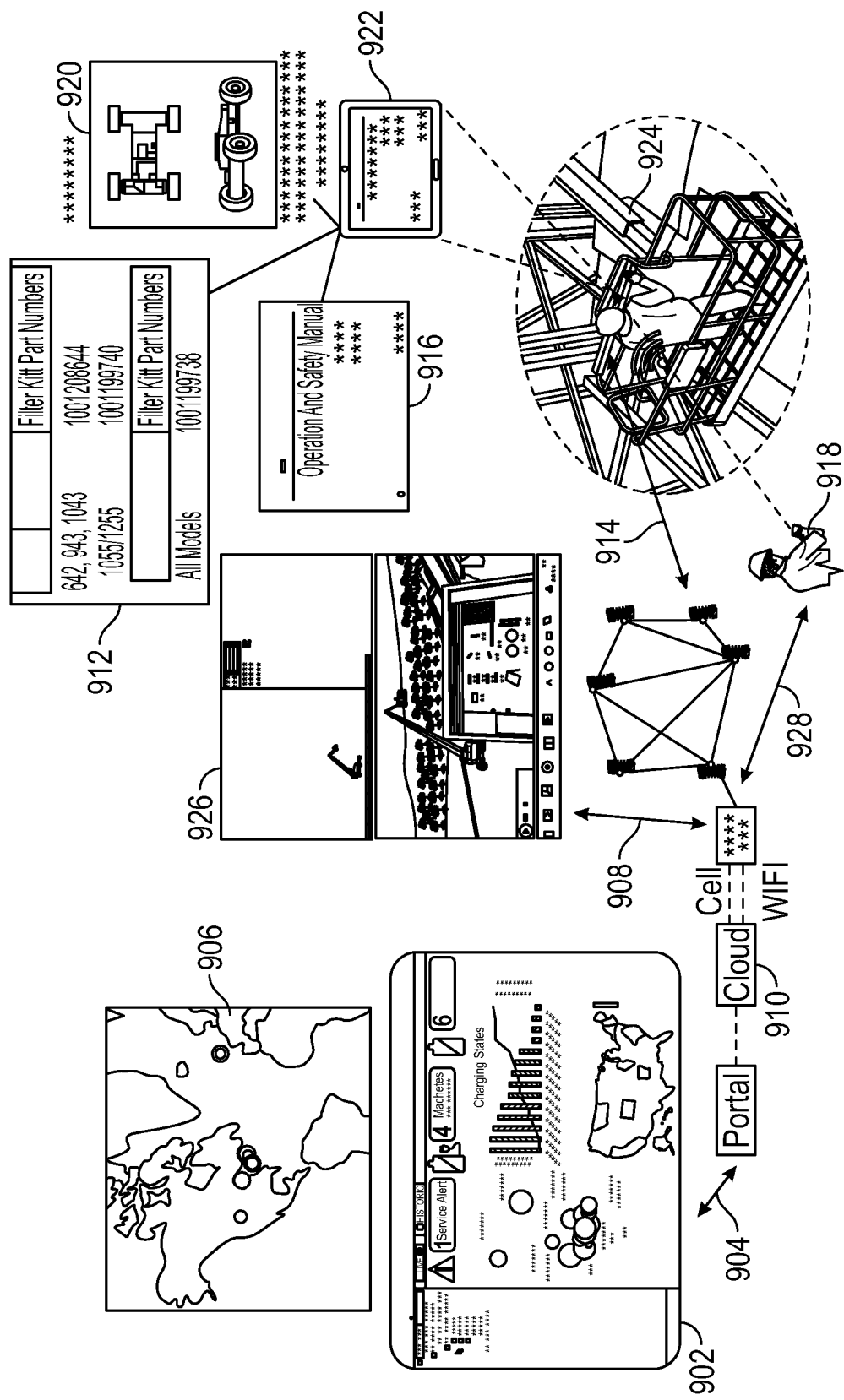
FIG. 9 is an illustrative example of graphical user interfaces of a fleet connectivity system, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
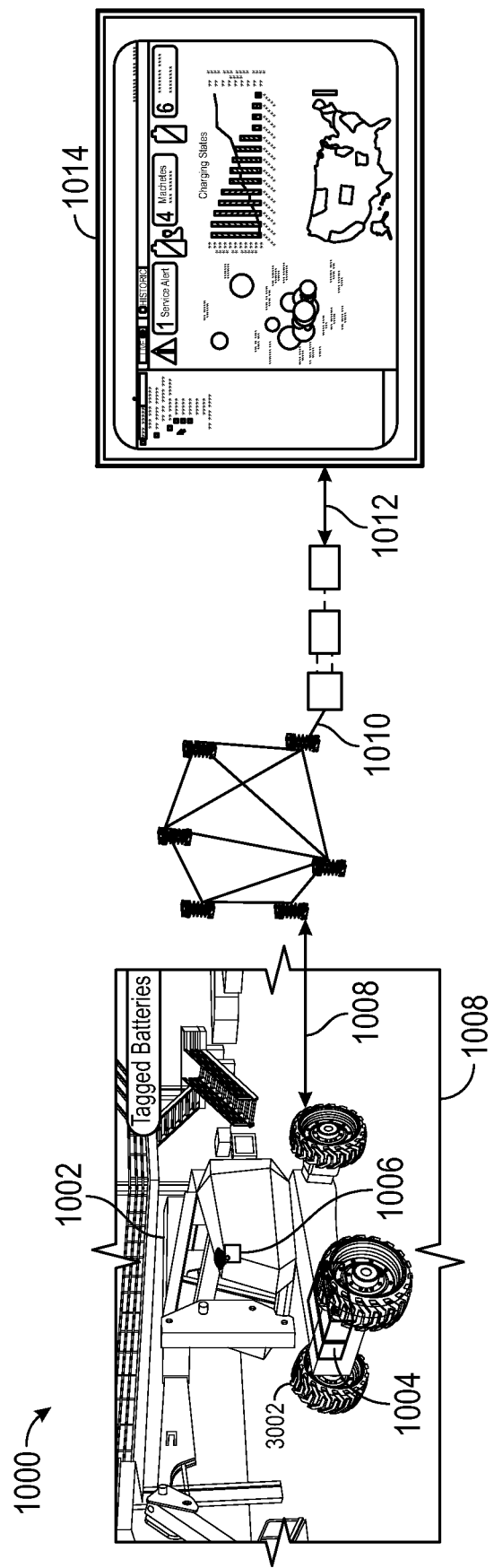
FIG. 10 is an illustrative representation of a work machine with machine specific output data connected to a fleet connectivity system, according to some embodiments.

As shown in FIG. 10, a tagged consumable tracking system 1000 is shown. A work machine 1002 on a jobsite 1008 includes tagged consumables 1004 (e.g., batteries connected to battery charger 1006). The work machine 1002 sends and receives data 1012 to and from a connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
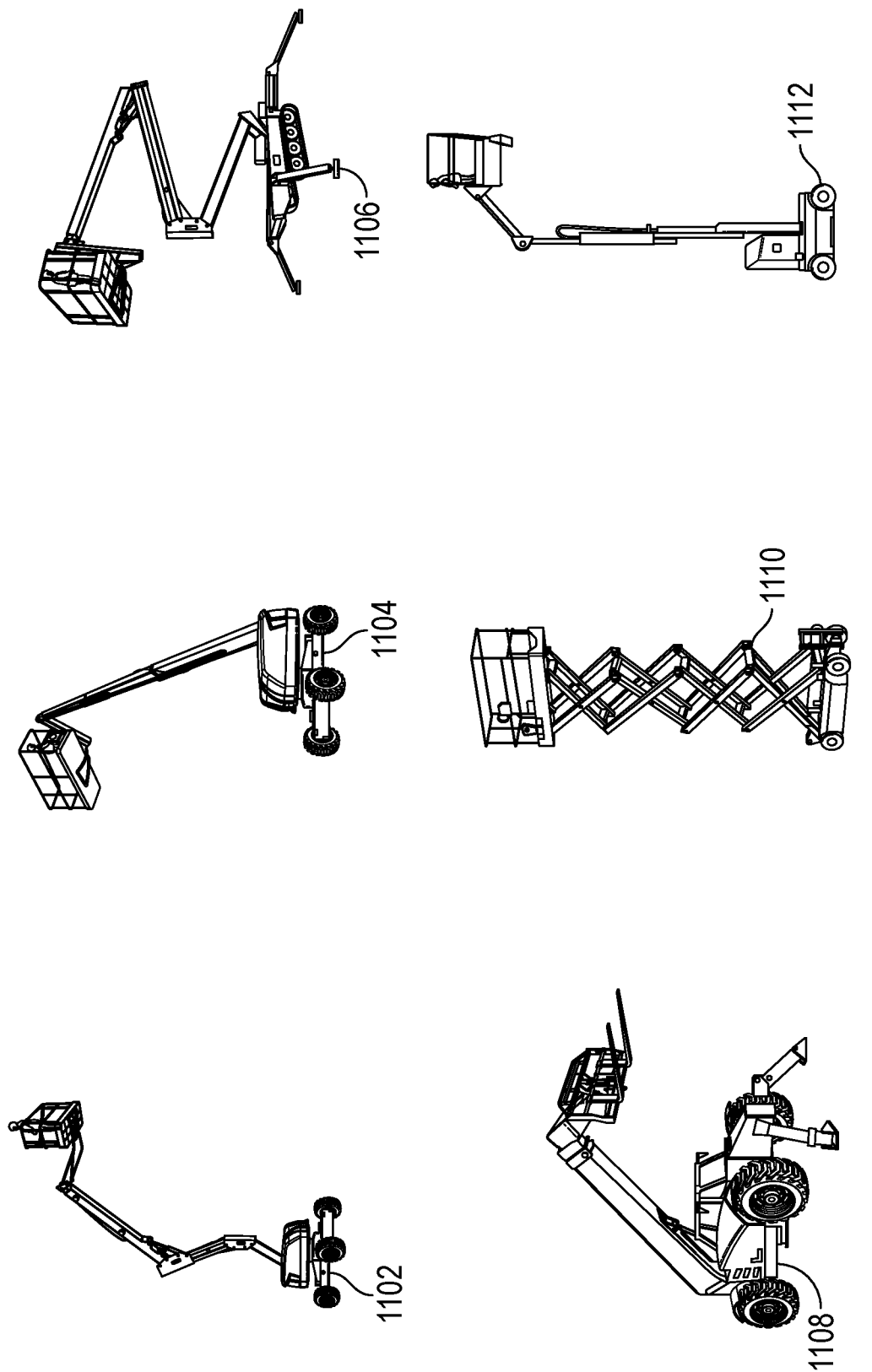
FIG. 11 is an illustrative representation of work machines configured for use in a connectivity system, according to some embodiments.

Referring now to in FIG. 11, the fleet connectivity network systems described above may be implemented using various work machines 20 (e.g., lift devices, etc.). For example, and as shown in FIG. 11, the fleet connectivity systems may be implemented as an articulating boom lift 1102, a telescoping boom lift 1104, a compact crawler boom lift 1106, a telehandler 1108, a scissor lift 1110 (and/or 506, 508 as shown in FIG. 5), and/or a toucan mast boom lift 1112.

According to the exemplary embodiment shown in FIG. 11, the work machines 20 (e.g., a lift device, articulating boom lift 1102, telescoping boom lift 1104, compact crawler boom lift 1106, telehandler 1108, scissor lift 1110, toucan mast boom lift 1112) include various working components. As an illustrative example, the articulating boom lift 1102 may include a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). According to the exemplary embodiment, the front tractive elements and the rear tractive elements include wheels; however, in other embodiments the tractive elements include a track element.

In an exemplary embodiment, the boom includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment, the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

In an exemplary embodiment, the lower boom has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). In some embodiments, the boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

In an exemplary embodiment, the upper boom has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. As shown in FIG. 11, the boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
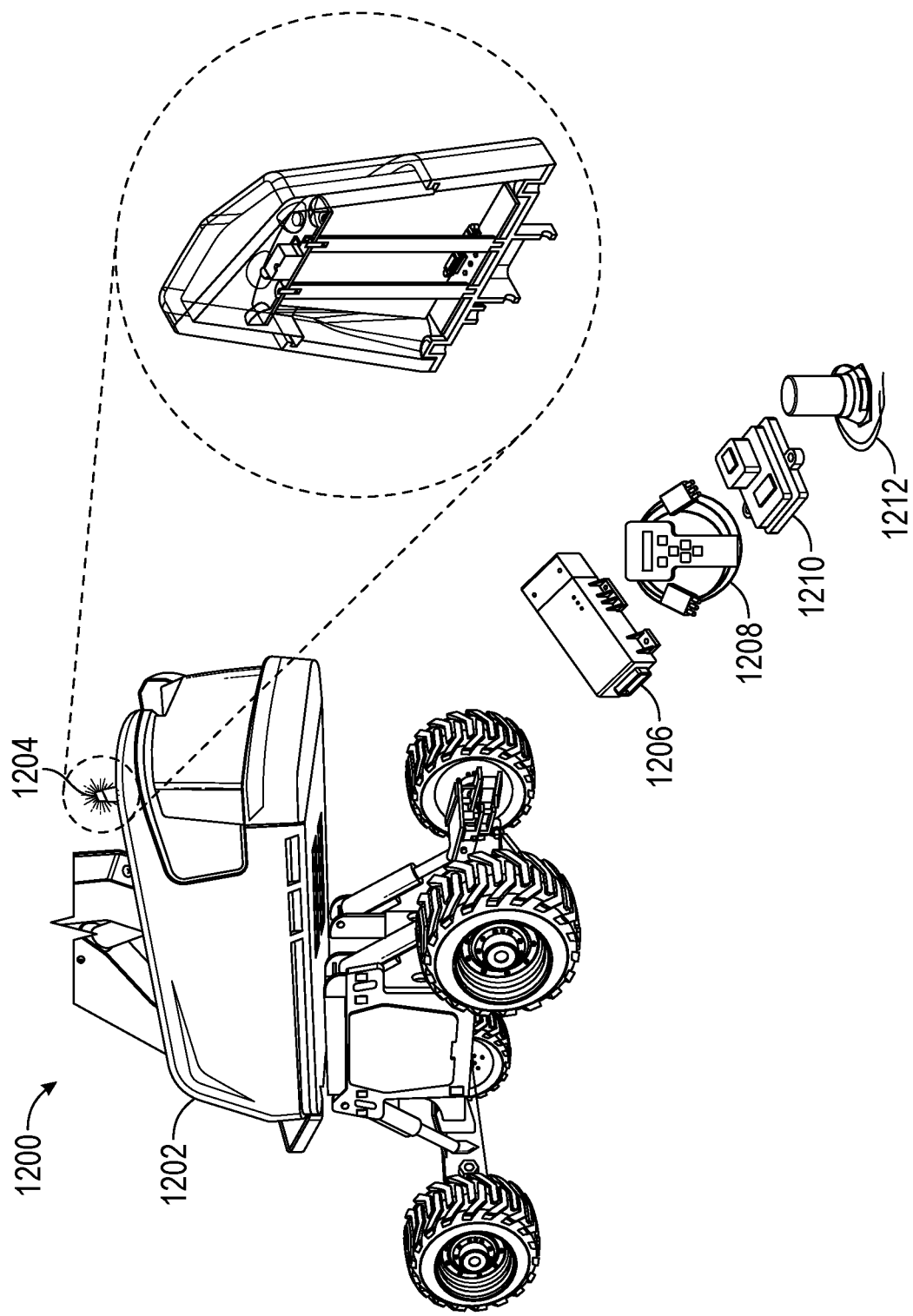
FIG. 12 is a representation of a work machine provisioned with an integrated connectivity module and beacon, according to some embodiments.

Referring to FIG. 12, work machine 1202, is provisioned with an indicator 1204 (e.g. a connectivity module with integrated beacon light, control devices, and communications devices). The indicator 1204 may, for example, illuminate a light visible to a user in response to user activation of a command on an application hosted on a user device connected to the local fleet connectivity system 200. The indicator 1204 may function like a conventional work machine warning beacon 1212.

Figure 13:
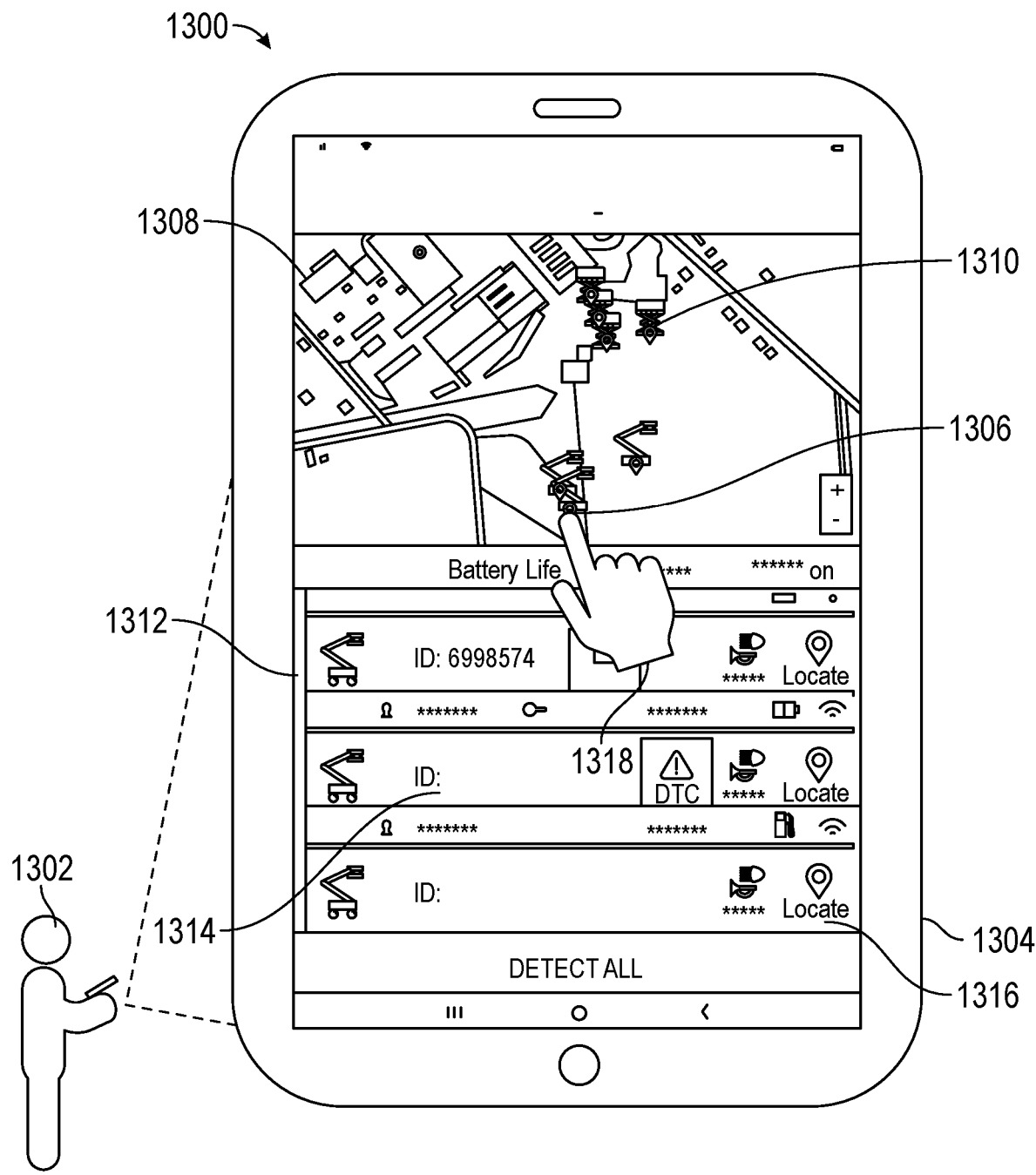
FIG. 13 is an illustration of a user operating a graphical user interface on a device connected to the fleet connectivity system, according to some embodiments.
Figure 14:
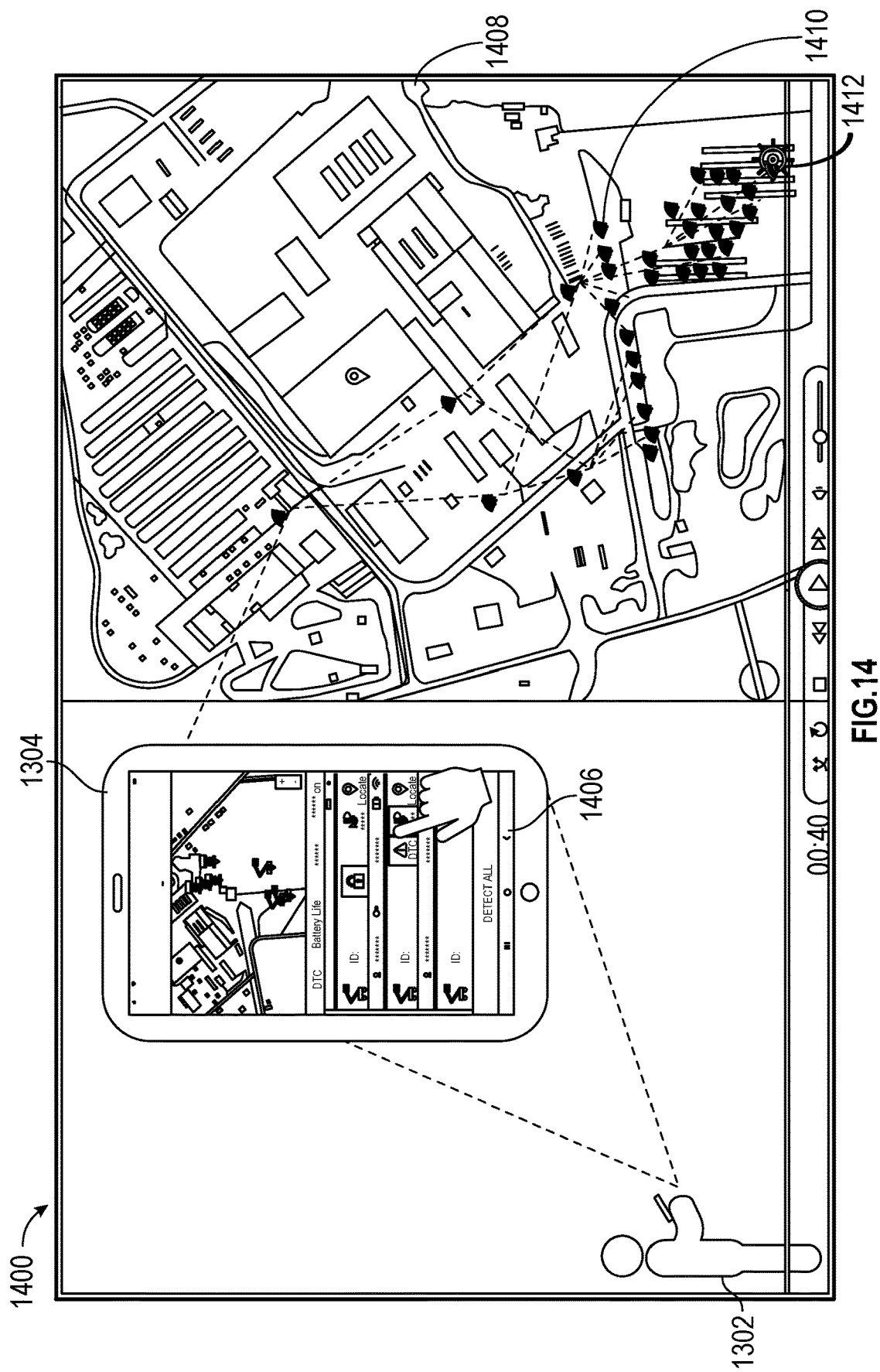
FIG. 14 is another illustration of a user operating a graphical user interface on a device connected to the fleet connectivity system, according to some embodiments.

Referring to FIG. 13-14, a user 1302 may use a fleet connectivity system by interacting 1318 with an application hosted on a user device 1304 that generates a user interface.

The user device 1304 and various work machines 1202 are interconnected via a fleet connectivity system (e.g., the local fleet connectivity system 200, the local fleet connectivity system 300, etc.). The user 1302 selects a machine 1306 from a work site view 1308 of a group of a machines 1310 connected to the fleet connectivity system at a work site. The user interface may depict, for example, imagery of a work site view 1308 with overlays of machine locations (e.g. a map) 1310 and information regarding machine specific information including status (e.g. fuel state, state of charge, etc.) 1312, 1314, 1316. The application may dynamically filter the map to illustrate the total machine population, locations, statuses, etc. of individual machines in the population. In some examples, a remote user may apply filters (e.g. filters related to machine status including self-test, fuel level, state of charge, etc.) to a specific work site network much the same as can be done locally via an application on a mobile user device (e.g. in the instance where a remote user can apply the desired user configurable rules to assist a local user w/o the need of mobile application use). The user may select a work machine, or group of machines, using an application and communicate with the work machine, or group of work machines (directly or via a cloud) to have that work machine provide a status indication (e.g. a colored light, a light pattern, a combination of light colors and patterns, etc.), as discussed above.

Referring to FIG. 14, an indicator on a connectivity module 1412 may be used to indicate various statuses of a work machine (e.g. fuel level, state of charge, fault status, ignition on/off, in operation, etc.). The application user interface 1406 can be used to select which status a user wants to be displayed on a fleet within user defined parameters (e.g. full fuel level, full charge, location, maintenance status, etc.). Features of the application can be used independently of or in conjunction with the filter criteria of a desired subset of a fleet.

Figure 15:
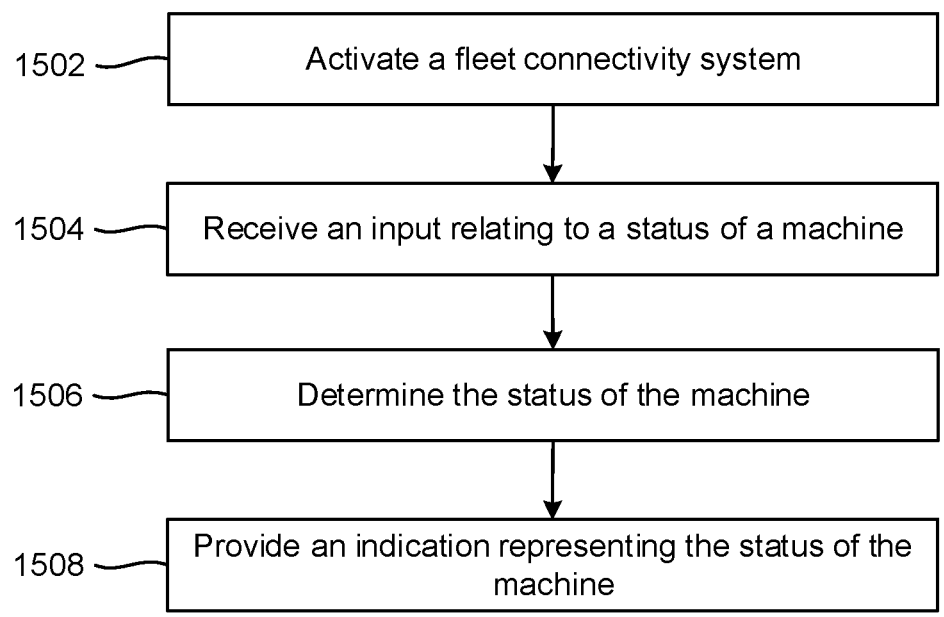
FIG. 15 is a flow diagram of a process implementing components of a fleet connectivity system to determine a status of a machine is shown, according to some embodiments.

Referring to FIG. 15, a process for implementing components of a fleet connectivity system is shown, according to an exemplary embodiment. The process 1500 may utilize any combination of components described herein. According to an exemplary embodiment, the process 1500 is also configured to provide an indication representing the status of a work machine (or work machines).

At step 1502, a fleet connectivity system is activated, according to an exemplary embodiment. The fleet connectivity system may be the local fleet connectivity system 200 of FIG. 2, the local fleet connectivity system 300 of FIG. 3, the fleet connectivity system 400 of FIG. 4, the fleet connectivity system 500 of FIG. 5, the fleet connectivity system 600 of FIG. 6, or any combination thereof. Further, at step 1502 the work machines, devices, equipment, systems, etc. of the fleet connectivity systems may be activated. For example, the work machines of the connectivity system may be deployed to a work site (e.g., the work machines 402, 404, 408, 410 may be deployed to a work site via the fleet connectivity system 400 of FIG. 4).

At step 1504, an input relating to the status of a work machine is received, according to an exemplary embodiment. In an exemplary embodiment, the input is received from an application on a user device (e.g., the user device 308), for example to a connectivity module and/or components of a work machine (e.g., via a network). The input may include a status of the machine desired by a user, an indication representing the status of the machine desired by the user, and/or any other suitable information relating to the status of a machine. For example, the status of a machine may include a desired state or condition of the machine (e.g., a fuel level, battery charge, the position/orientation of a component of the machine, whether the machine is on or off, whether the machine is in operation or moving, etc.), a quality of the machine (e.g., the machine requires a charge, a diagnostic check, a trouble shooting check, maintenance is required, DTC, etc.), a characteristic of the machine (e.g., machine type, model, work site tag, etc.), etc. In addition, a desired indication representing the status of the machine may include a visual indication (e.g. a light that is colored, patterned, includes other visual characteristics, etc., as discussed above), an audio indication (e.g., noise, alarm, warning, message, etc.), a tactile indication (e.g., vibration, etc.), another other suitable indication (e.g., a message to the user device, an icon on an application, an icon on a graphical user interface, etc.), and/or any combination thereof. In an exemplary embodiment, the input is received by a connectivity module from an application of a user device. The connectivity module may further communicate the input to other components of the work machine (e.g., a control system, a controller, etc.), in order to determine the status of the machine, as discussed in step 1506. In some embodiments, the input is received by other components of the work machine (e.g., a control system, a controller, a user interface, etc.), for example via a network.

In other embodiments, the input relating to the status of a machine is received from components of the work machine, for example a control system, controller, sensors, etc. The input may include a status of a machine desired as a result of a task that was provided to the work machine when the fleet connectivity system was activated (e.g., at step 1502). Further, the input may include a status of a machine that is desired as a result of preferences, thresholds, models that are stored in the work machine (e.g., a control system, controller, etc.), for example as a result of user, manufacturer, regulatory, etc. requirements. In this regard, a work machine may automatically receive an input relating to a status of a machine when the work machine is activated, a predetermined condition exists, a task is assigned, and/or any other suitable event occurs that results in an input. As discussed above, the input may include a status of the work machine desired, an indication of the status of the work machine desired, and/or any other suitable information relating to the status of the work machine.

At step 1506, the status of the machine is determined, according to an exemplary embodiment. In an exemplary embodiment, components of a work machine receive the input relating to the status of the machine, and automatically determine the status of the machine. For example, a connectivity module may receive the input (e.g., from a user device), communicate the input to components of the work machine (e.g., a control system, controller, etc.), and the components of the work machine may determine the status of the work machine via other suitable components (e.g., sensors, processors, computers, etc.). In some embodiments, a connectivity module is configured to receive the input relating to the status of a machine, and determines the status of the work machine itself (e.g., via integrated sensors, processors, computers, etc.). As discussed above, the status of the work machine relate to various conditions, states, characteristics, qualities, etc. of a work vehicle.

At step 1508, an indication is provided representing the status of the machine, according to an exemplary embodiment. In an exemplary embodiment, the indication is provided via an indicator, which may be communicably coupled to the work machine and/or components thereof (e.g., a connectivity module, control system, controller, etc.). According to an exemplary embodiment, the indicator is a device and/or system that is configured to provide a visual indication (e.g. a light that is colored, patterned, includes other visual characteristics, etc., as discussed above), an audio indication (e.g., noise, alarm, warning, message, etc.), a tactile indication (e.g., vibration, etc.), another other suitable indication (e.g., a message to the user device, an icon on an application, an icon on a graphical user interface, etc.), and/or any combination thereof, as discussed above. In this regard, in response to a work machine receiving an input relating to a status of a work machine (and determining the status of the work machine) the indicator may provide the indication representing the status of the work machine to a user (or observer), so as to increase efficiency and/or productivity in the workflow of completing tasks.

As an illustrative example, a fleet connectivity system may be activated, which includes activating a plurality of work devices. A user may access an application (e.g., via a user device), and submit a request for a device that has a charge status above 75% to be indicated by a flashing green light. The user may desire to locate the work machine that satisfies this desired charge status, and which is in the closest proximity to the user. The user device (e.g., application) may communicate the request (e.g., the desired status of the work machine, the desired indication of the status of the work machine, etc.) in the form of an input to all of the work machines in the fleet. Each work machine in the fleet may receive the input (e.g., at the connectivity module, control system, etc.) and/or communicate the input to other components of the work machine (e.g., a control system, controller, processor, etc.). Each work machine may then determine the charge status of that device (e.g., via a sensor, processor, computer, etc.). After each work machine has determined its charge status, each machine may provide an indication that represents the determined charge status of that machine, for example via the indicator. For example, it may be determined that one work machine in the fleet has a charge status of 90%, which may be indicated via a visual flashing green light. Further, it may be determined that seven work machines in the fleet have a charge status of 50%, which may be indicated via a yellow flashing light. Finally, it may be determined that fifteen of the work machines in the fleet have a charge status of less than 25%, which may be indicated via a red light. In this sense, the various indications may allow a user to quickly identify the work machine (or machines) in a fleet that satisfy the user's requirements. Further, the indications may be used for additional processes (e.g., maintenance, quality, repair, etc.), which may be used to reduce machine downtime (e.g., due to insufficient power or energy, maintenance, repair, etc.), increase efficiency (e.g., due to determinations of machine proximity, power and lifetime availability, machine characteristics, etc.), and/or streamline workflow within a working environment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift device, comprising:
   an implement;
   a prime mover configured to drive the implement; and
   a connectivity module communicably coupled with the lift device, wherein the connectivity module is configured to:
   receive, from a user device, a selection of an attribute of a component of the lift device and an indicator characteristic;
   determine a threshold measure associated with the selected attribute;
   receive, from the user device, a request to provide a status of the component of the lift device;
   receive, via a sensor of the lift device, a measure associated with the selected attribute of the component of the lift device;
   compare, via the connectivity module, the received measure and the threshold measure associated with the selected attribute of the component of the lift device; and
   provide, via the connectivity module and based on the comparison, an indication in accordance with the indicator characteristic representing the status of the component of the lift device.

2. The lift device of claim 1, further comprising an indicator communicably coupled to the connectivity module, wherein the indicator is configured to provide the indication representing the status of the component of the lift device to an observer.

3. The lift device of claim 2, wherein the indicator is a lighting device and the indication is at least one of the lighting device in a solid on state, a solid off state, a flashing state, or a strobe state.

4. The lift device of claim 3, wherein the lighting device in the solid on state indicates the status of a battery of the lift device is fully charged.

5. The lift device of claim 3, wherein the lighting device in the flashing state indicates the status of a battery of the lift device is charging.

6. The lift device of claim 2, wherein the status of the component of the lift device is at least one of a fuel level of the lift device, a battery power level of the lift device, an ignition status of the lift device, or an operational status of the lift device.

7. The lift device of claim 1, wherein the threshold measure is determined via a control system of the lift device.

8. The lift device of claim 1, wherein the connectivity module is configured to operate in a first mode, wherein the connectivity module is configured to operate in the first mode when the lift device is powered on, and wherein in the first mode the connectivity module is configured to communicate with the user device via a long range radio frequency networking communication.

9. The lift device of claim 8, wherein the connectivity module is configured to operate in a second mode, wherein the connectivity module is configured to operate in the second mode when the lift device is powered off, and in the second mode the connectivity module is configured to communicate with the user device via a short range radio frequency networking communication.

10. The lift device of claim 1, wherein the attribute of the component is a power level of a battery of the lift device.

11. The lift device of claim 1, wherein the attribute of the component is an ignition status of the prime mover of the lift device.

12. A fleet connectivity system, comprising:
    a user device; and
    a lift device comprising:
      an implement;
      a prime mover configured to drive the implement; and
      a connectivity module communicably coupled with the lift device, wherein the connectivity module is configured to:
      receive, from the user device, a selection of an attribute of a component of the lift device and an indicator characteristic;
      determine a threshold measure associated with the selected attribute;
      receive, from the user device, a request to provide a status of the component of the lift device;
      receive, via a sensor of the lift device, a measure associated with the selected attribute of the component of the lift device;
      compare, via the connectivity module, the received measure and the threshold measure associated with the selected attribute of the component of the lift device; and
      provide, via the connectivity module and based on the comparison, an indication in accordance with the indicator characteristic representing the status of the component of the lift device.

13. The fleet connectivity system of claim 12, wherein the lift device further comprises an indicator communicably coupled to the connectivity module, and wherein the indicator is configured to provide the indication representing the status of the component of the lift device.

14. The fleet connectivity system of claim 13, wherein the indicator is a lighting device and the indication is at least one of the lighting device in a solid on state, a solid off state, a flashing state, or a strobe state.

15. The fleet connectivity system of claim 14, wherein the connectivity module is configured to determine the threshold measure via a control system of the lift device.

16. The fleet connectivity system of claim 12, wherein the connectivity module is configured to provide the indication to the user device, and wherein the indication is a graphical user interface status icon that the user device displays.

17. A method for providing a status of a component of a lift device, comprising:
   receiving, from a user device, a selection of an attribute of the component of the lift device and an indicator characteristic;
   determining a threshold measure associated with the selected attribute;
   receiving, from the user device, a request to provide the status of the component of the lift device;
   receiving, via a sensor of the lift device, a measure associated with the selected attribute of the component of the lift device;
   comparing, via a connectivity module, the received measure and the threshold measure associated with the selected attribute of the component of the lift device; and
   providing, via an indicator and based on the comparison, an indication in accordance with the indicator characteristic representing the status of the component of the lift device.

18. The method of claim 17, wherein the indicator is a lighting device, and wherein providing the indication representing the status of the component of the lift device includes providing at least one of the lighting device in a solid on state, a solid off state, a flashing state, or a strobe state.

19. The method of claim 18, wherein providing the lighting device in the solid on state indicates the status of a battery of the lift device is fully charged.

20. The method of claim 17, wherein comparing the received measure and the threshold measure associated with the attribute of the component of the lift device includes determining at least one of a fuel level of the lift device, a battery power level of the lift device, an ignition status of the lift device, or an operation status of the lift device.

* * * * *